US012025284B2

(12) United States Patent
Matsuoka et al.

(10) Patent No.: US 12,025,284 B2
(45) Date of Patent: Jul. 2, 2024

(54) VEHICLE LIGHTING UNIT

(71) Applicant: Ichikoh Industries, Ltd., Isehara (JP)

(72) Inventors: Kenji Matsuoka, Isehara (JP); Kunihiro Shimizu, Isehara (JP)

(73) Assignee: Ichikoh Industries, Ltd., Isehara (JP)

( * ) Notice: Subject to any disclaimer, the term of this patent is extended or adjusted under 35 U.S.C. 154(b) by 0 days.

(21) Appl. No.: 18/247,104

(22) PCT Filed: Sep. 29, 2021

(86) PCT No.: PCT/JP2021/035963
§ 371 (c)(1),
(2) Date: Mar. 29, 2023

(87) PCT Pub. No.: WO2022/071433
PCT Pub. Date: Apr. 7, 2022

(65) Prior Publication Data

US 2023/0366521 A1 Nov. 16, 2023

(30) Foreign Application Priority Data

Sep. 30, 2020 (JP) ................................ 2020-166236

(51) Int. Cl.
*F21S 41/19* (2018.01)
*F21S 41/143* (2018.01)
(Continued)

(52) U.S. Cl.
CPC ............ *F21S 41/19* (2018.01); *F21S 41/143* (2018.01); *F21S 41/28* (2018.01); *F21S 41/32* (2018.01); *F21S 45/40* (2018.01)

(58) Field of Classification Search
CPC ........ F21S 41/192; F21S 41/151; F21S 41/19; F21S 43/14; F21S 45/48; F21S 43/195;
(Continued)

(56) References Cited

U.S. PATENT DOCUMENTS

2010/0128479 A1* 5/2010 Biebl ..................... F21V 29/80
362/249.02

FOREIGN PATENT DOCUMENTS

| | | | | |
|---|---|---|---|---|
| JP | 2011-171277 | A | | 9/2011 |
| JP | 2012084280 | A | * | 4/2012 |
| JP | 2013-247062 | A | | 12/2013 |

OTHER PUBLICATIONS

International Search Report issued Nov. 16, 2021 in PCT/JP2021/035963, filed on Sep. 29, 2021, 2 pages.

(Continued)

*Primary Examiner* — William J Carter
(74) *Attorney, Agent, or Firm* — Oblon, McClelland, Maier & Neustadt, L.L.P.

(57) ABSTRACT

A vehicle lighting unit ensures support rigidity of a substrate connection part in the front-rear direction without increasing components. The vehicle lighting unit includes a light source part, a power feeding member, a heat dissipation member, and a socket. The light source part has a light-emitting element, and a substrate connected to the light-emitting element. The power feeding member supplies power to the light source part. The heat dissipation member is mounted with the light source part. The socket is assembled on the rear side opposite to the front surface of the heat dissipation member mounted with the light source part. In the vehicle lighting unit, the substrate and the power feeding member are electrically connected by the substrate connection part. The heat dissipation member integrally has an extension support unit that supports at least the substrate connection part in placement in a front-rear direction of the heat dissipation member.

8 Claims, 12 Drawing Sheets

(51) Int. Cl.
*F21S 41/20* (2018.01)
*F21S 41/32* (2018.01)
*F21S 45/40* (2018.01)

(58) Field of Classification Search
CPC .......... F21S 41/141; F21S 43/19; F21S 45/47; F21S 45/49
See application file for complete search history.

(56) References Cited

OTHER PUBLICATIONS

Japanese Office Action issued Feb. 20, 2024 in Japanese Patent Application No. 2020-166236 (with English Translation), 6 pages.

* cited by examiner

VEHICLE LIGHTING UNIT

TECHNICAL FIELD

The present disclosure relates to a vehicle lighting unit.

BACKGROUND ART

In a conventional vehicle lighting unit, a light-emitting chip is mounted on a mounting surface which is an upper surface of a substrate, and a contact surface which is a lower surface of the substrate is in close contact with a contact surface which is an upper surface of a metal body. A fixed surface which is a lower surface of the metal body is fixed to a heat conductive resin member. The metal body transfers heat generated in a light source part, which is composed of the light-emitting chip, the substrate, and the like, to the heat conductive resin member. One of outer peripheral edges of the metal body (edge to which a power feeding member corresponds) is provided with an avoidance recess to avoid the power feeding member. One end of the power feeding member is electrically connected and mechanically mounted by solder through the substrate (see PTL 1, for example).

CITATION LIST

Patent Literature

PTL 1: Japanese Patent Laid-open No. 2013-247062

SUMMARY OF THE INVENTION

Problems to be Solved by the Invention

In the conventional vehicle lighting unit, a portion of the substrate is not supported by the metal body because a portion of the substrate is disposed in the avoidance recess in the direction perpendicular to the contact surface of the substrate. Furthermore, since a substrate connection part on the substrate side, where the substrate and the power feeding member are electrically connected via solder or other means, is a portion where the substrate is not partially supported by the metal body, it is difficult to support the substrate connection part. Therefore, there is a problem that the support rigidity of the substrate connection part in the vertical direction is not ensured.

The present disclosure has been made in view of the above problem, and therefore an object of the present disclosure is to provide a vehicle lighting unit that ensures the support rigidity of the substrate connection part in the front-rear direction without increasing the number of components.

Means for Solving the Problem

In order to achieve the above purpose, the vehicle lighting unit of the present disclosure includes a light source part, a power feeding member, a heat dissipation member, and a socket. The light source part has a light-emitting element, and a substrate connected to the light-emitting element. The power feeding member supplies power to the light source part. The heat dissipation member is mounted with the light source part. The socket is assembled on a rear side opposite to a front surface of the heat dissipation member mounted with the light source part. In this vehicle lighting unit, the substrate and the power feeding member are electrically connected by a substrate connection part. The heat dissipation member integrally has an extension support unit that supports at least the substrate connection part in placement in the front-rear direction of the heat dissipation member.

Effect of the Invention

Accordingly, it is possible to ensure the support rigidity of a substrate connection part in the front-rear direction without increasing the number of components.

MODE FOR CARRYING OUT THE INVENTION

Figure 1:
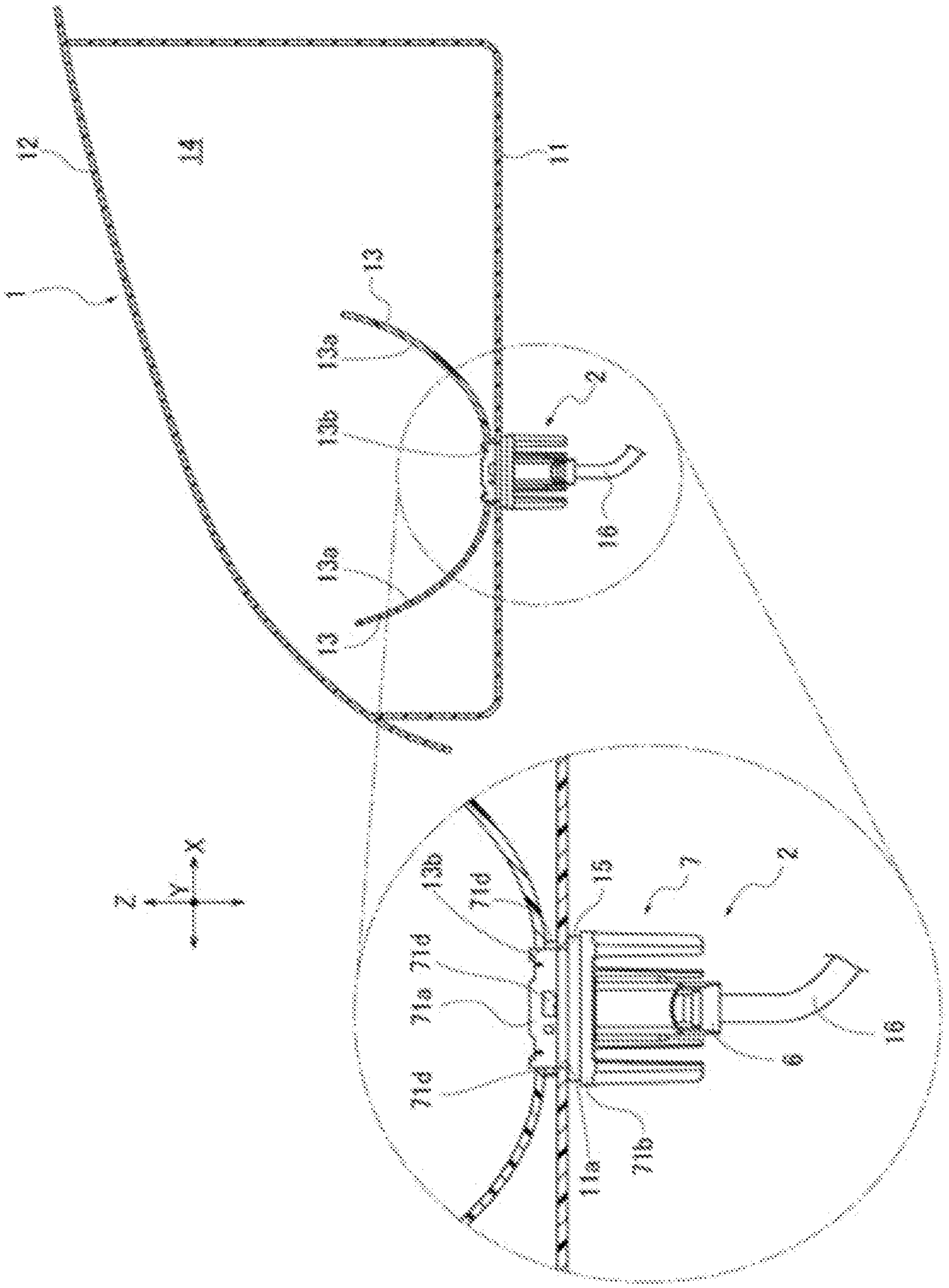
FIG. 1 is an explanatory diagram illustrating a vehicle lighting unit of the present disclosure.

Hereinafter, a mode for carrying out a vehicle lighting unit according to the present disclosure will be described on the basis of Embodiment 1 illustrated in the drawings.

Embodiment 1

A vehicle lighting unit 1 according to Embodiment 1 is used as a lighting unit for a vehicle such as an automobile, and is applicable to a headlamp, a fog lamp, a daytime running lamp, a clearance lamp, or the like. In the following description, in the vehicle lighting unit 1, the direction in which a vehicle travels straight ahead (front-rear direction) and light is emitted is the optical axis direction ("Z" in the drawing, and the direction of emission is defined as the front side). The vertical direction when mounted on a vehicle is the up-down direction ("Y" in the drawing). The direction orthogonal to the optical axis direction and the up-down direction (left-right direction) is the width direction ("X" in the drawing). Hereinafter, a configuration of Embodiment 1 will be divided into an "overall configuration, a "configuration of a light source unit," and a "main part configuration of a heat dissipation member, and described below.

With reference to FIG. 1, the overall configuration will be described.

As illustrated in FIG. 1, the vehicle lighting unit 1 includes a lamp housing 11, a lamp lens 12, a reflector 13, and a light source unit 2. The lamp housing 11 is formed of a light impermeable material such as a colored or painted resin material, and is hollow with an opened front side and a blocked rear side. In the lamp housing 11, a mounting hole 11*a* that passes through a blocked rear end is provided. In an edge of the mounting hole 11*a*, a plurality of cutout parts and stopper parts are provided at substantially equal intervals.

The lamp lens 12 is formed of a transparent resin member, a glass member, or other light-transmitting material, and is shaped in such a shape that an opened front end of the lamp housing 11 can be covered. The lamp lens 12 is fixed to an opening of the lamp housing 11 in a sealed state, and water-tightness is ensured. A lamp chamber 14 is formed by sectioning by the lamp housing 11 and the lamp lens 12.

The reflector 13 is a light distribution control unit that controls light distribution of emission light emitted from the light source unit 2, and is fixed to the lamp housing 11 and the like. The reflector 13 is disposed in the lamp chamber 14. The reflector 13 is formed in a curved shape with a focal point near a light-emitting part 31*c* (described below) of the light source unit 2. The reflector 13 has a reflection surface 13*a* which is an inner surface that reflects light, and is provided with a mounting hole 13*b* at a bottom. The mounting hole 13*b* has such a positional relation as to communicate with the mounting hole 11*a* of the lamp housing 11 in a state in which the reflector 13 is disposed in the lamp chamber 14. The reflector 13 is formed as a separate member from the lamp housing 11, but may have an integral configuration, that is, the inner surface of the lamp housing 11 may be used as a reflection surface, or may have other configuration. Instead of the reflector 13 (reflection surface 13*a*), a light guide member may be provided on the front side of the light source unit 2 in the optical axis direction to emit light at a different position or in a different size region from the light-emitting part 31*c*, and is not limited to the configuration of Embodiment 1. Even with such a light guide member, the vehicle lighting unit 1 can be used, for example, as a headlamp, a fog lamp, a daytime running lamp, a clearance lamp, or the like.

The light source unit 2 is disposed in the lamp chamber 14 through the mounting hole 11*a* of the lamp housing 11 and the mounting hole 13*b* of the reflector 13. The light source unit 2 is removably mounted on the mounting hole 11*a* of the lamp housing 11 with a sealing member 15 (O-ring, rubber packing) between the light source unit 2 and the lamp housing 11. The light source unit 2 may be provided in the lamp chamber 14 via a vertical optical axis adjustment mechanism and a horizontal optical axis adjustment mechanism.

Now, a configuration of the light source unit 2 will be described with reference to FIG. 2 to FIG. 12.

Figure 2:
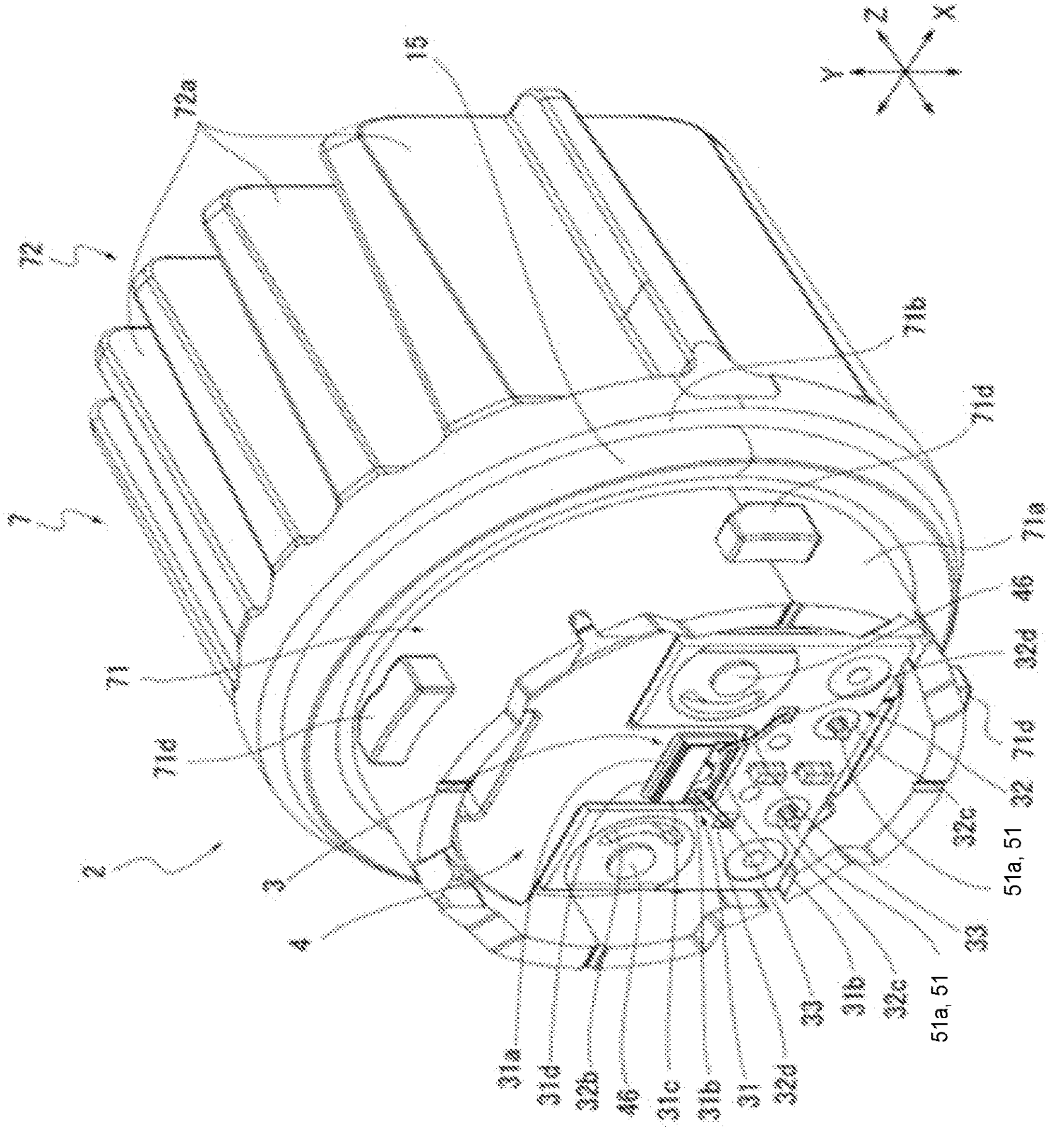
FIG. 2 is a front perspective view illustrating a light source unit of the present disclosure.
Figure 3:
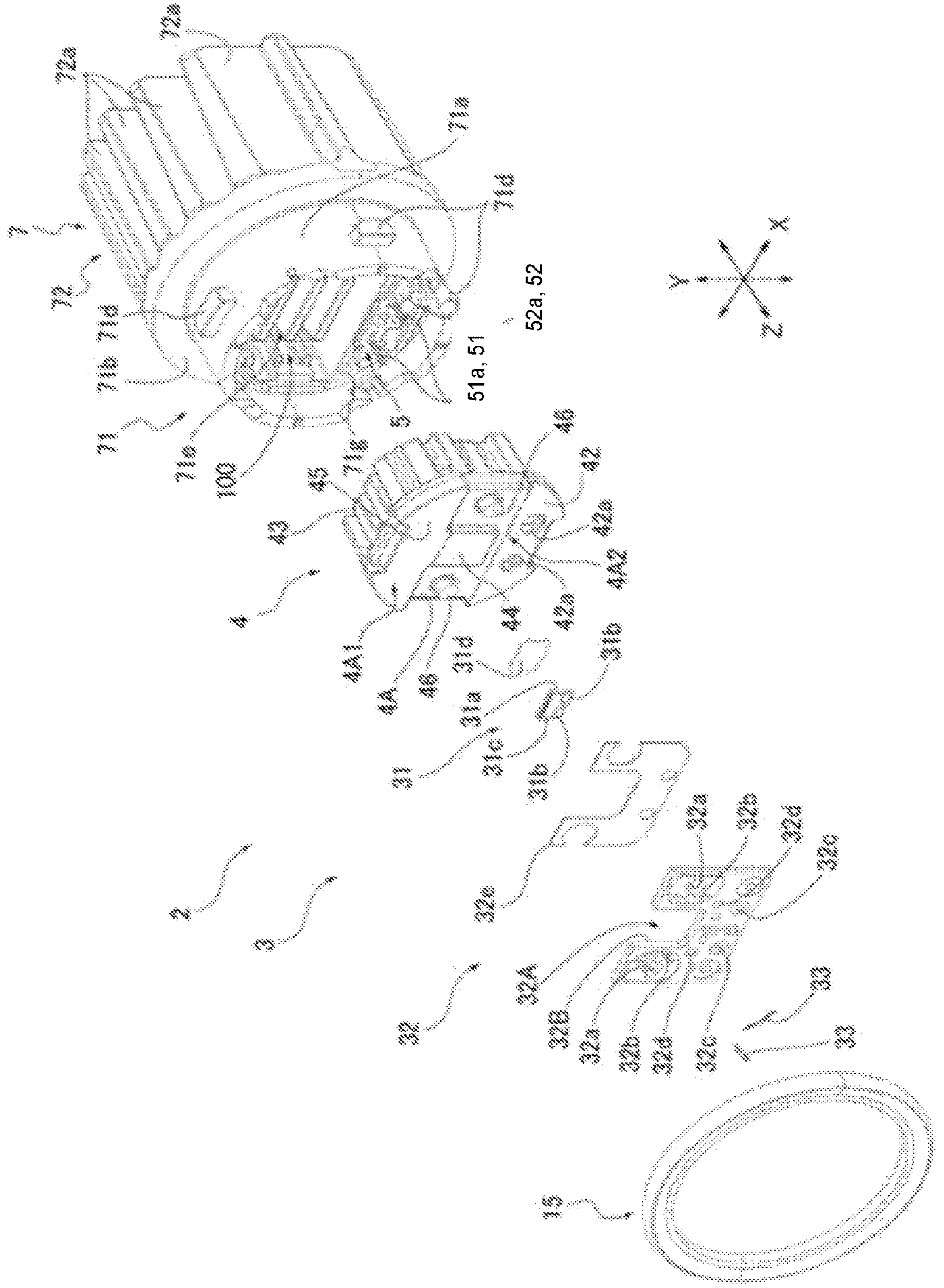
FIG. 3 is an exploded perspective view illustrating the light source unit of the present disclosure.
Figure 11:
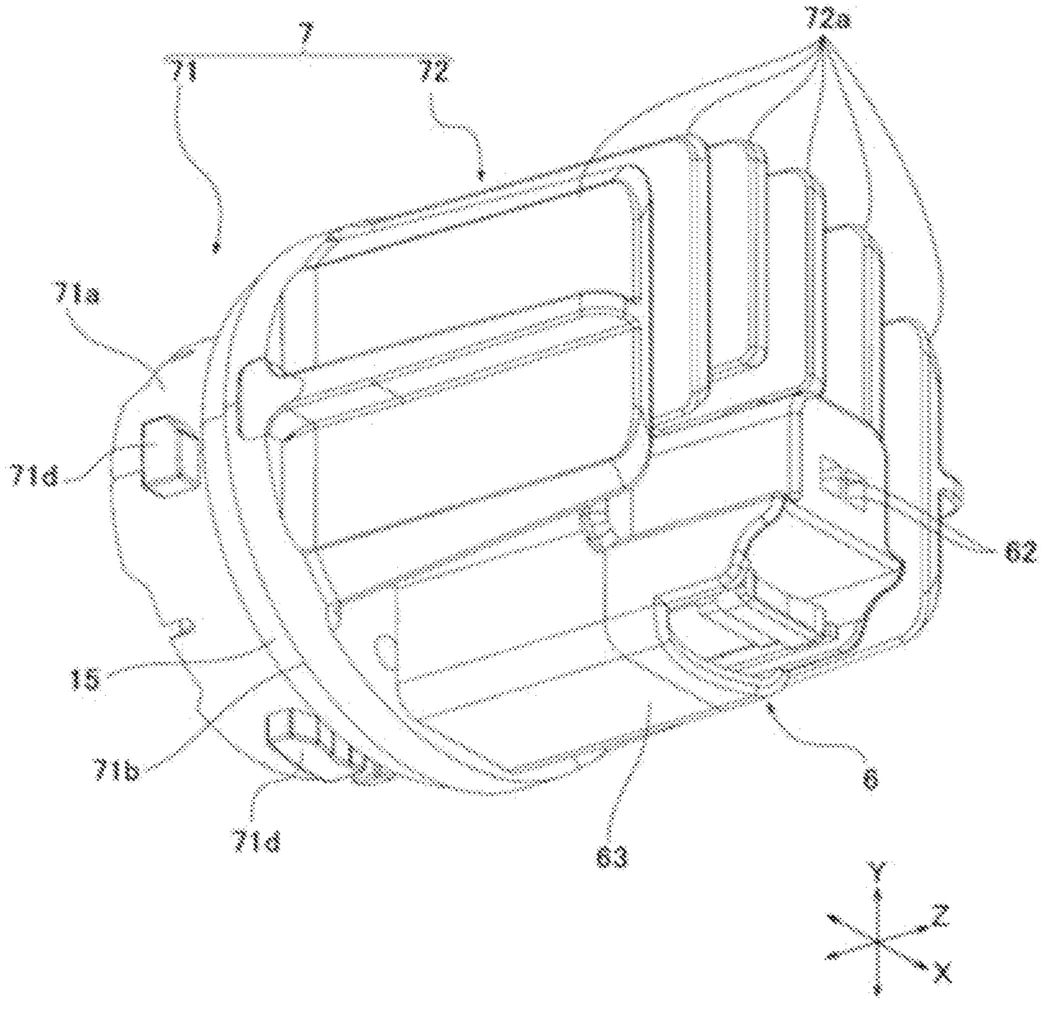
FIG. 11 is a rear perspective view illustrating the light source unit of the present disclosure.

As illustrated in FIG. 2, FIG. 3, FIG. 11, and the like, the light source unit 2 includes a light source part 3, a heat dissipation member 4 (heat sink), a power feeding member 5 (light source side connector), a power supply side connector 6, a socket 7, and the sealing member 15 (see FIG. 1).

As illustrated in FIG. 2 to FIG. 6, the light source part 3 has a light-emitting element 31, a circuit substrate 32 (substrate), and a pair of bonding wires 33 (bonding ribbons).

The light-emitting element 31 has a submount substrate 31*a*, a pair of light-emitting electrode parts 31*b* (light-emitting terminal parts), the light-emitting part 31*c* (light-emitting chip), and an adhesive agent 31*d* (adhesion layer). The light-emitting element 31 is a submount type, in which the light-emitting part 31*c* is provided on the submount substrate 31*a*, and the light-emitting element 31 is separate from the circuit substrate 32.

The submount substrate 31*a* is formed in a rectangle when viewed from the front in the optical axis direction. On the lower side of the front surface of the submount substrate 31*a*, the respective light-emitting electrode parts 31*b* are provided on the left and the right one by one, and light-emitting part 31*c* is mounted on the upper side of the front surface of the submount substrate 31*a*. The submount substrate 31*a* has an electric path that electrically connects the light-emitting electrode parts 31*b* and the light-emitting part 31*c*. A rear surface of the submount substrate 31*a* is mounted on the heat dissipation member 4 by the adhesive agent 31*d*. The adhesive agent 31*d* is thermally conductive. The adhesive agent 31*d* is a material such as epoxy resin adhesive, silicone resin adhesive or acrylic resin adhesive, and is in liquid form, fluid form or tape form.

The light-emitting part 31*c* is a self-luminous semiconductor light source such as an LED (Light Emitting Diode), an LD chip (Laser Diode chip), and an EL (Organic EL), and is substantially rectangular in shape when viewed from the front. The light-emitting part 31*c* is disposed near the focal point of the reflector 13 in a state in which the light source unit 2 is assembled into the lamp housing 11. The light-emitting part 31*c* lights up when power is supplied from the circuit substrate 32 to the light-emitting electrode parts 31*b*. When the light guide member described above is used, the light-emitting part 31*c* is located in the vicinity of an incident part of the light guide member.

The circuit substrate 32 transmits a control signal from a control circuit installed in a vehicle to the light-emitting part 31*c*, which has a plurality of elements such as capacitors. The circuit substrate 32 supplies power from the power feeding member 5 to the light-emitting element 31. The circuit substrate 32 is shaped with a substrate cutout part 32B formed by cutting out the upper side of a center 32A, viewed from the front. In other words, the circuit substrate 32 is formed in a concave shape or a U-shape when viewed from the front. The circuit substrate 32 has a pair of caulking hole parts 32*a* (hole part), a pair of curved hole parts 32*b*, a pair of terminal connection hole parts 32*c* (substrate side substrate connection parts), a pair of substrate electrode parts 32*d*, and an adhesive sheet 32*e*. The circuit substrate 32 has an electric path that electrically connects the terminal connection hole parts 32*c* and the substrate electrode parts 32*d*. The pair of caulking hole parts 32*a*, the pair of curved hole parts 32*b*, the pair of terminal connection hole parts 32*c* are penetrated in the optical axis direction of the circuit substrate 32. The circuit substrate 32 is mounted on the heat dissipation member 4 by the adhesive sheet 32*e*. In the adhesive sheet 32*e*, at least portions corresponding to the caulking hole parts 32*a*, the curved hole parts 32*b*, and the terminal connection hole parts 32*c* of the circuit substrate 32 are cut out. The adhesive sheet 32*e* is made of a material such as epoxy resin adhesive, silicone resin adhesive and acrylic resin adhesive, and is in a tape form. The adhesive sheet 32*e* may be in a liquid or fluid form, or other form, instead of the tape form.

The respective caulking hole parts 32*a* are provided on the left and the right of the substrate cutout part 32B one by one. Positioning protrusion parts 46 (described below) are inserted into the caulking hole parts 32*a*, and the positioning protrusion parts 46 are calked, so that the circuit substrate 32 is fixed to the heat dissipation member 4. Each one of the curved hole parts 32*b* is between the substrate cutout part 32B and the caulking hole part 32*a*. Each curved hole part 32*b* is formed in such a curved shape as to protrude toward the substrate cutout part 32B in the width direction. The respective terminal connection hole parts 32*c* are provided on the left and the right one by one on the lower side of the substrate cutout part 32B. The respective terminal connection hole parts 32*c* are provided at such positions as to overlap (correspond to) the left and right terminal insertion hole parts 42*a* (descried below) in the optical axis direction when the circuit substrate 32 is mounted on a front surface 4A of the heat dissipation member 4. Respective terminal one end portions 51*a* (described below) are inserted into the terminal connection hole parts 32*c*. On the front side of each of the terminal connection hole parts 32*c*, the terminal connection hole part 32*c* and the terminal one end portion 51*a* are electrically connected via solder (not illustrated). The respective substrate electrode parts 32*d* are provided on the left and the right one by one between the substrate cutout part 32B and the terminal connection hole parts 32*c* in the up-down direction. The position of each substrate electrode part 32*d* is located outward in the width direction from the position of the light-emitting electrode part 31*b* when the light-emitting element 31 and the circuit substrate 32 are mounted on the heat dissipation member 4 (see FIG. 4).

The bonding wires 33 electrically connect the left and right light-emitting electrode parts 31*b* and the left and right substrate electrode parts 32*d*, respectively, by wire bonding using ultrasonic waves. Consequently, the circuit substrate 32 supplies power from the power feeding member 5 to the light-emitting element 31. Each bonding wire 33 is formed in such a curved shape as to protrude toward the front in the optical axis direction.

As illustrated in FIG. 3 to FIG. 10, the heat dissipation member 4 is a heat sink member that conducts (releases) heat generated from the light-emitting part 31*c* to the socket 7, and is formed of a metal or resin material with high thermal conductivity. For example, the heat dissipation member 4 is formed by aluminum die-cast having thermal conductivity. The heat dissipation member 4 integrally has a base part 41 (body), an extension support unit 42, a fin part 43, a first projection part 44, a second projection part 45, a pair of the positioning protrusion parts 46.

Figure 7:
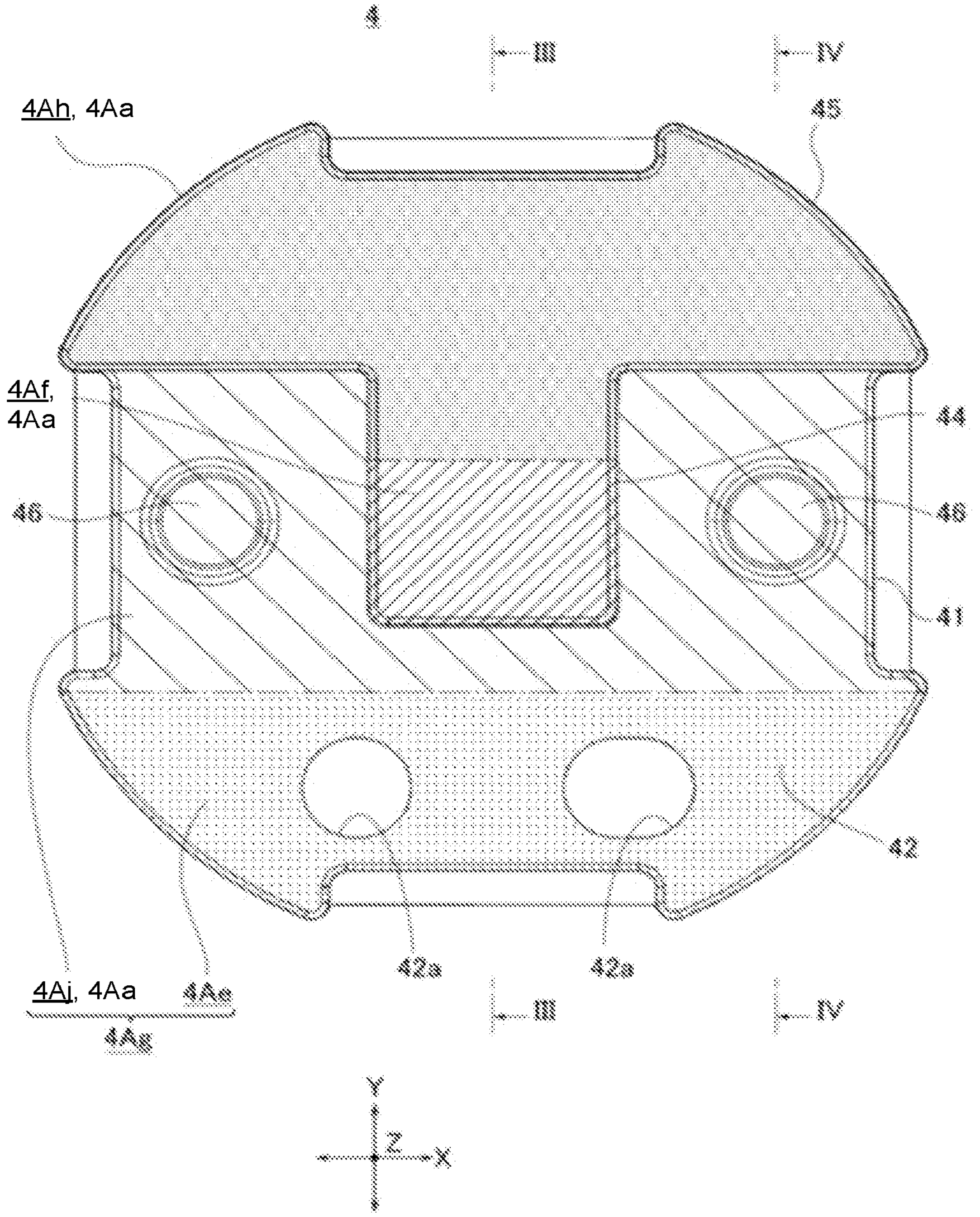
FIG. 7 is an explanatory diagram illustrating the heat dissipation member of the present disclosure.
Figure 8:
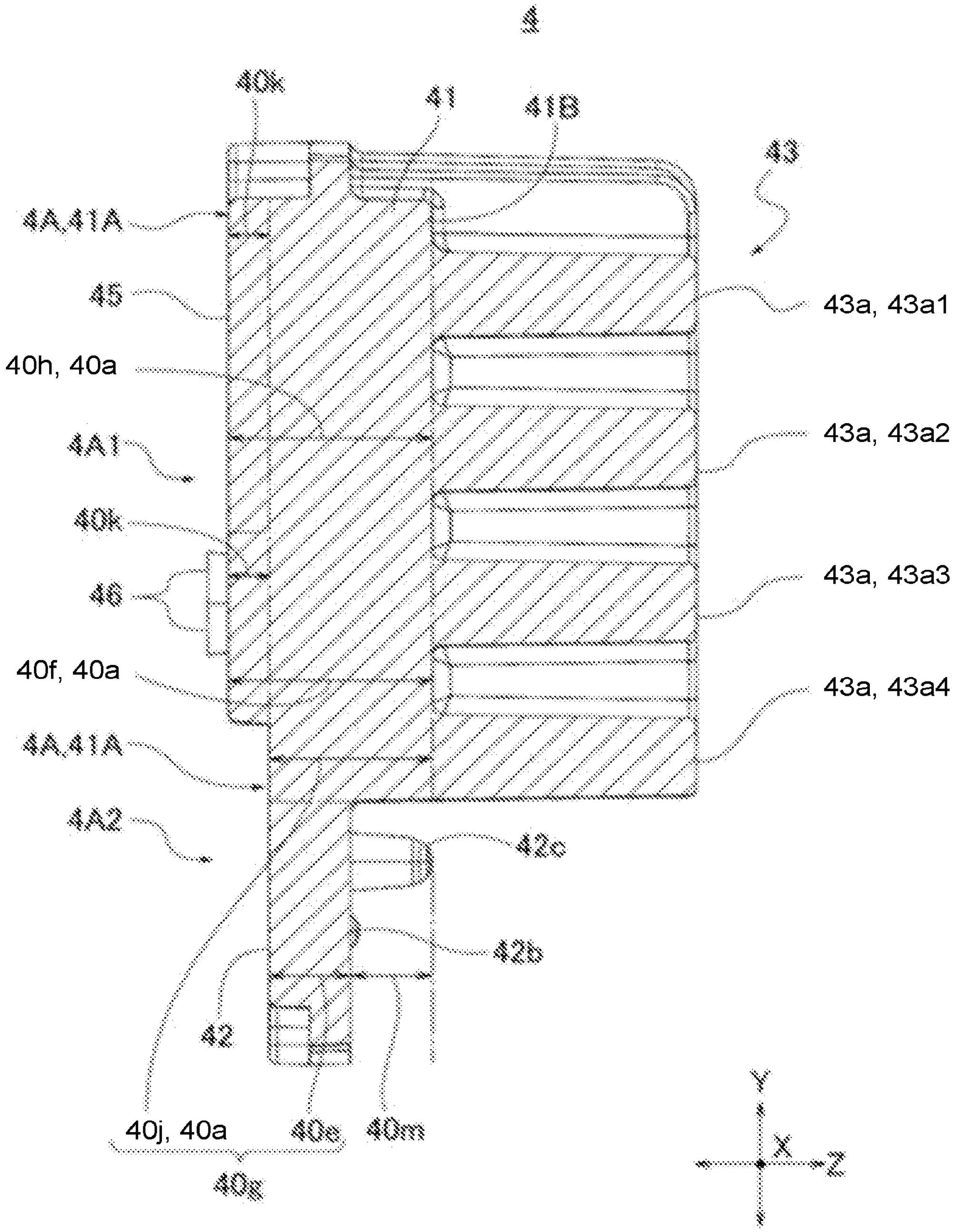
FIG. 8 is a sectional view illustrating a cross section of the heat dissipation member of the present disclosure, taken along a line in FIG. 7.
Figure 9:
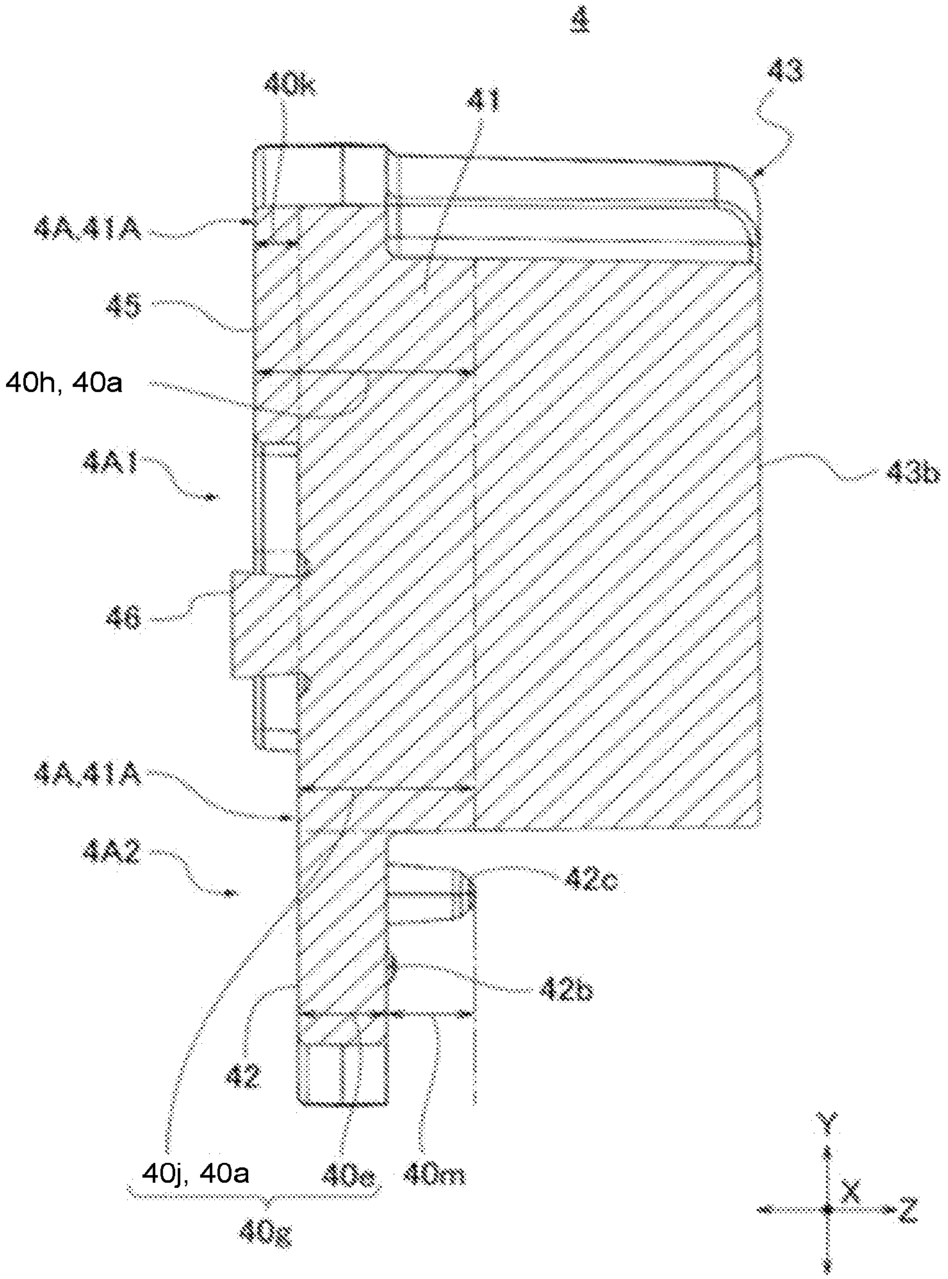
FIG. 9 is a sectional view illustrating a cross section of the heat dissipation member of the present disclosure, taken along a IV-IV line in FIG. 7.

As illustrated in FIG. 7 to FIG. 9, the base part 41 is formed in a plate shape perpendicular to the optical axis direction. The base part 41 has a substantially arcuate shape on the upper side and a substantially rectangular shape on the lower side when viewed from the front. The first projection part 44 and the second projection part 45 are provided on the front side of the base part 41, and the fin part 43 is provided on the rear side of the base part 41. The extension support unit 42 is provided on the lower side of the base part 41.

Figure 5:
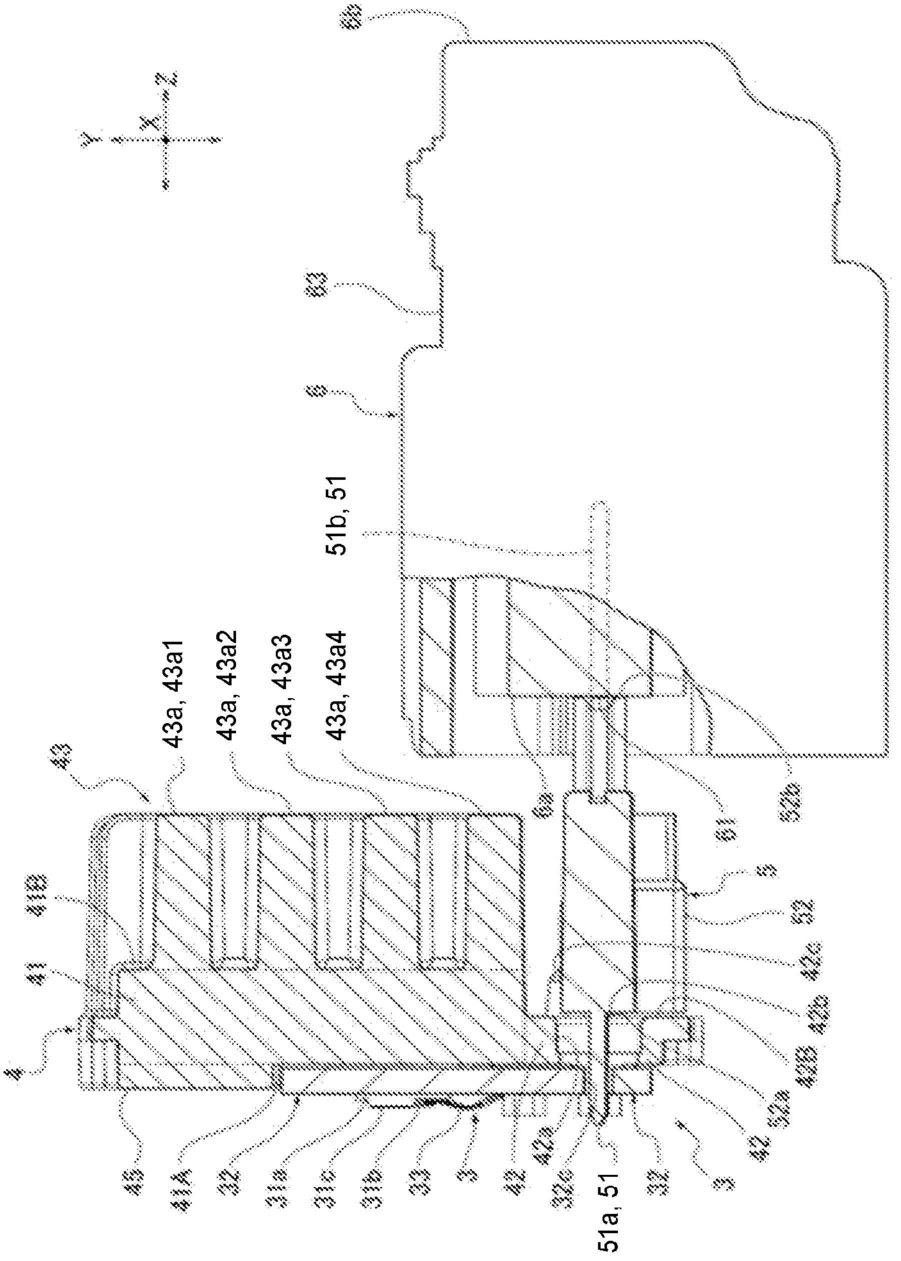
FIG. 5 is a sectional view illustrating a cross section of the light source part, the heat dissipation member, the power feeding member, and the power supply side connector of the present disclosure, which is a broken surface illustrating a partial breakage of the power supply side connector of the present disclosure, and is a sectional view taken along a line I-I in FIG. 4.
Figure 10:
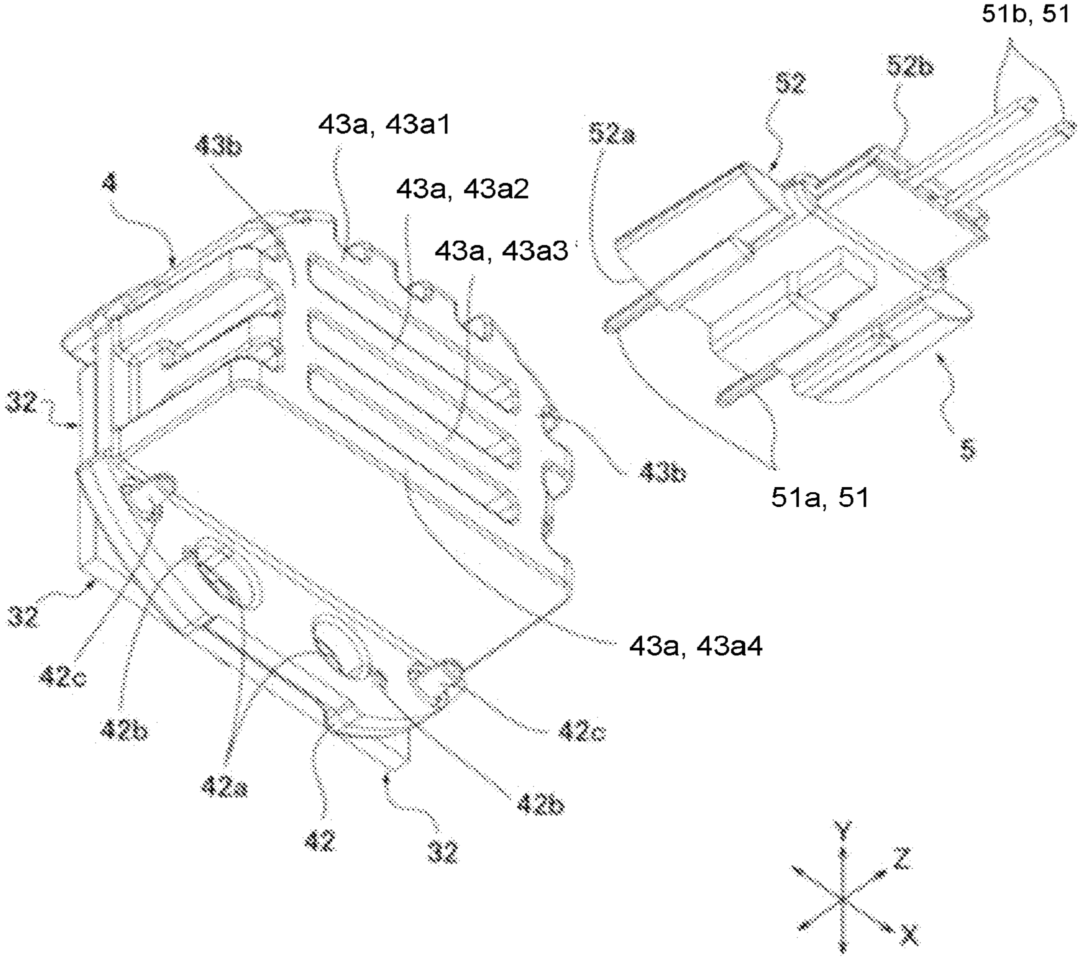
FIG. 10 is an exploded perspective view illustrating the light source part, the heat dissipation member, and the power feeding member of the present disclosure.

The extension support unit 42 is provided at a front end portion in the optical axis direction of the base part 41 on the lower side of the base part 41. In other words, the extension support unit 42 is formed by extending the base part 41 downward. In other words, the extension support unit 42 is provided on the lower side in the up-down direction with respect to the first projection part 44 when mounted on the vehicle. The extension support unit 42 is formed in a plate shape perpendicular to the optical axis direction. The extension support unit 42 has a substantially arcuate shape when viewed from the front. As illustrated in FIG. 5, FIG. 10, and other drawings, the extension support unit 42 has a pair of the terminal insertion hole parts 42*a*, a pair of first protrusions 42*b*, and a pair of second protrusions 42*c*. The respective terminal insertion hole parts 42*a* are penetrated in the optical axis direction of the extension support unit 42, and are provided on the left and the right one by one. Each of the terminal insertion hole parts 42*a* is provided at such a position as to overlap (correspond to) the terminal connection hole part 32*c* in the optical axis direction when the circuit substrate 32 is mounted on the front surface 4A of the heat dissipation member 4. Therefore, the extension support unit 42 supports the terminal connection hole parts 32*c* on the socket 7 side (rear side) in the optical axis direction. The diameters of the terminal insertion hole parts 42*a* are set to be larger than those of the terminal connection hole parts 32*c*. The terminal one end portions 51*a* of power feeding terminals 51 are inserted into the terminal insertion hole parts 42*a*. Each first protrusion 42*b* is formed in such a protruding shape that the extension support rear surface 42B of the extension support unit 42 protrudes. The respective first protrusions 42*b* are provided on the left and the right one by one, and are disposed with the pair of terminal insertion hole parts 42*a* therebetween in the width direction. The first protrusions 42*b* are brought into contact with an insulating one end surface 52*a* (described below) when the terminal one end portions 51*a* are inserted into the terminal insertion hole parts 42*a*. Each second protrusion 42*c* is formed in such a protruding shape that the extension support rear surface 42B protrudes with respect to the first protrusion 42*b*. The respective second protrusions 42*c* are provided on the left and the right one by one, and are disposed with the pair of first protrusions 42*b* therebetween in the width direction.

As illustrated in FIG. 8 to FIG. 10 and other drawings, the fin part 43 has a plurality of parallel fins 43*a* and a plurality of connecting fins 43*b* formed by protruding a base rear surface 41B. Each parallel fin 43*a* is formed in the form of a flat plate orthogonal to the up-down direction at the base rear surface 41B. The parallel fins 43*a* are provided in parallel at predetermined intervals in the up-down direction. That is, the parallel fins 43*a* each have a flat outer surface on each of the top and the bottom by being flat-plate shaped, and are arranged in parallel with each other with the outer surfaces facing each other. For example, the number of the parallel fins 43*a* is four. The connecting fins 43*b* bridge the parallel fins 43*a* in the up-down direction. For example, the number of the connecting fins 43*b* is two. The two connecting fins 43*b* are located inside ends in the width direction of each parallel fin 43*a* and reach a bottom parallel fin 43*a*4 from a top parallel fins 43*a*1 through two intermediate parallel fins 43*a*2 and 43*a*3 in the up-down direction. Therefore, the fin part 43 consists of the four parallel fins 43*a* and the two connecting fins 43*b* assembled in a grid pattern. The parallel fins 43*a* and the connecting fins 43*b* are superimposed at an intersection.

The intermediate parallel fin 43*a*3 (third from the top parallel fin 43*a*1) is provided at such a position as to overlap with the pair of positioning protrusion parts 46 in the optical axis direction (on the same line in the optical axis direction), as illustrated in FIG. 8. As illustrated in FIG. 9, each of the connecting fins 43*b* is provided at such a position as to overlap the positioning protrusion part 46 in the optical axis direction (on the same line in the optical axis direction). In other words, each of the left and right intersections of the intermediate parallel fin 43$a$3 and the connecting fins 43$b$ overlaps the positioning protrusion part 46 in the optical axis direction (on the same line in the optical axis direction).

As illustrated in FIG. 7 to FIG. 9 and other drawings, the first projection part 44 is formed in such a projecting shape that a base front surface 41A protrudes. The first projection part 44 is rectangular in shape when viewed from the front. The first projection part 44 is provided in a central portion of the overall front surface 4A of the heat dissipation member 4. It is assumed that the overall front surface 4A of the heat dissipation member 4 does not include the positioning protrusion parts 46 from the heat dissipation member 4. The second projection part 45 is formed in such a projecting shape that the base front surface 41A protrudes. In the second projection part 45 has a substantially arcuate shape on the upper side and a substantially rectangular shape on the lower side when viewed from the front. In other words, the second projection part 45 is formed in a T-shape when viewed from the front. The second projection part 45 is provided on the upper side of the overall front surface 4A of the heat dissipation member 4 in the up-down direction with respect to the first projection part 44 when mounted on a vehicle. The first projection part 44 and the second projection part 45 are formed in such a projecting shape as to protrude forward by the same amount (see FIG. 8). The first projection part 44 and the second projection part 45 are formed in a single projecting shape. In other words, the second projection part 45 is continuous from the upper side of the first projection part 44, and the first projection part 44 and the second projection part 45 are adjacent to each other with no space therebetween. The overall front surface 4A of the heat dissipation member 4 is stepped by the first projection part 44 and the second projection part 45. Therefore, the overall front surface 4A of the heat dissipation member 4 is divided into two parts: a projecting surface portion 4A1 of the first projection part 44 and second projection part 45, and a remaining recessed surface portion 4A2 which is recessed with respect to the projecting surface portion 4A1.

The positioning protrusion parts 46 are each formed in such a cylindrical shape as to protrude forward from the base front surface 41A with respect to the first projection part 44 and the second projection part 45. The respective positioning protrusion parts 46 are provided on the left and the right of the first projection part 44 one by one, and are disposed with the first projection part 44 therebetween in the width direction. Each of the positioning protrusion parts 46 is inserted into the caulking hole part 32$a$ to be caulked, so that the circuit substrate 32 is fixed to the heat dissipation member 4 (see FIG. 4 and other drawings). The respective positions of the positioning protrusion parts 46 are such positions as to overlap (on the same line in the optical axis direction) with the left and right intersections of the intermediate parallel fin 43$a$3 and the connecting fins 43$b$ in the optical axis direction.

Figure 12:
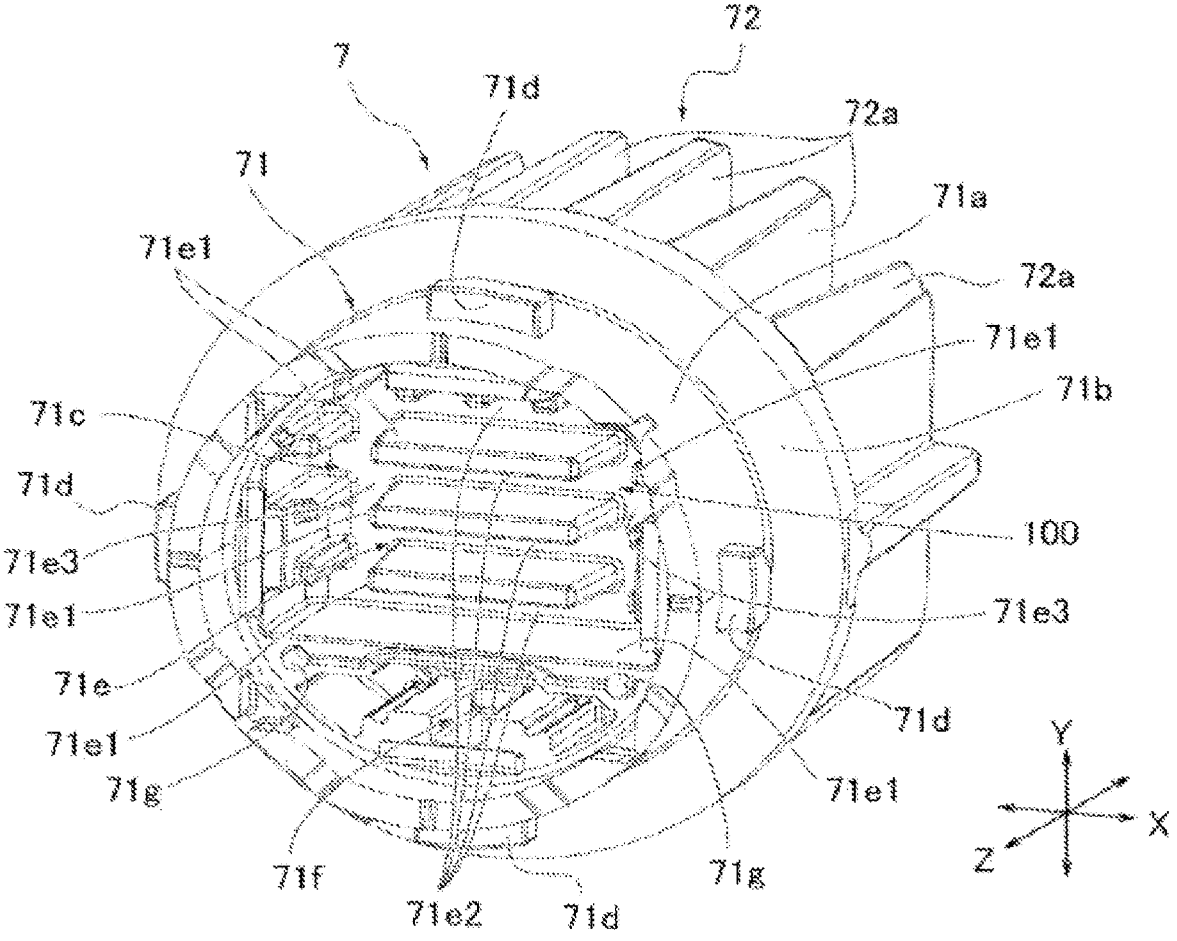
FIG. 12 is a front perspective view illustrating a socket of the present disclosure.

As illustrated in FIG. 5, the power feeding member 5 is a light source side connector of connectors. The connectors are the power feeding member 5 and the power supply side connector 6. The power feeding member 5 is connected to the power supply side connector 6 (see FIG. 11), which is mechanically detachable and electrically intermittently connectable, and supplies power from the power supply side connector 6 to the light source part 3. As illustrated in FIG. 3 and FIG. 12, the power feeding member 5 is fixed to the socket 7 by being fitted into a power feeding mounting hole 71$f$ (described below) through an insulating material. As illustrated in FIG. 5, FIG. 10, and other drawings, the power feeding member 5 has a pair of the power feeding terminals 51 (electrode pins), and a power feeding insulating part 52. The power feeding terminals 51 are each formed in a pin shape and covered by the power feeding insulating part 52, leaving a pair of the terminal one end portions 51$a$ and a pair of terminal other end portions 51$b$. Each of the terminal one end portions 51$a$ is inserted into the terminal insertion hole part 42$a$ and the terminal connection hole part 32$c$. On the front side of each of the terminal connection hole parts 32$c$, the terminal connection hole part 32$c$ and the terminal one end portion 51$a$ are electrically connected via solder (not illustrated). Each of the terminal other end portions 51$b$ is electrically connected by being inserted into the connector electrode part 61 (described below). The insulating one end surface 52$a$ of the power feeding insulating part 52 is brought into contact with the pair of first protrusions 42$b$ when the terminal one end portions 51$a$ are inserted into the terminal insertion hole parts 42$a$. Consequently, when the power feeding member 5 is positioned with respect to the heat dissipation member 4, and the terminal one end portions 51$a$ are positioned with respect to the terminal connection hole parts 32$c$. An insulating other end surface 52$b$ of the power feeding insulating part 52 is brought into contact with a connector one surface 6$a$ (described below) when the connector electrode parts 61 are inserted into the terminal other end portions 51$b$. Consequently, the power feeding member 5 is sandwiched between the extension support unit 42 and the power supply side connector 6 in the optical axis direction.

As illustrated in FIG. 1 and FIG. 5, the power supply side connector 6 is a power supply side connector of the connectors, and feeds power to the power feeding member 5. As illustrated in FIG. 11, the power supply side connector 6 is fixed to the socket 7 by being fitted with the socket 7 behind and below a socket heat dissipation part 72 (described below). As illustrated in FIG. 5, FIG. 11, and other drawings, the power supply side connector 6 has a pair of the connector electrode parts 61, and a pair of harness connection parts 62, and a connector insulating part 63. The pair of connector electrode parts 61 and the pair of harness connection parts 62 are covered by the connector insulating part 63, leaving electrode portions at ends thereof. The connector electrode parts 61 and the terminal other end portions 51$b$ are electrically connected to each other. The harness connection parts 62 and harnesses 16 are electrically connected to each other (see FIG. 1). Consequently, the power feeding terminals 51 and the harnesses 16 are electrically connected to each other through the power supply side connector 6 (see FIG. 1 and FIG. 5). The connector one surface 6$a$ is brought into contact with the insulating other end surface 52$b$, when the terminal other end portions 51$b$ are inserted into the connector electrode parts 61.

As illustrated in FIG. 1 to FIG. 3, FIG. 11, and FIG. 12, the socket 7 is a member that releases (radiates) heat conducted from the heat dissipation member 4 to the outside and is formed of a thermally conductive material (e.g., a resin material). The socket 7 is assembled on the rear side opposite to the front surface 4A of the heat dissipation member 4 mounted with the light source part 3. The socket 7 integrally has a socket body 71, and the socket heat dissipation part 72. In the optical axis direction, the socket body 71 is provided on the front side of the socket 7, and the socket heat dissipation part 72 is provided on the rear side of the socket 7.

The socket body 71 has a peripheral wall 71*a*, a flange wall 71*b*, a bottom wall 71*c*, four mounting protrusions 71*d*, a groove 71*e*, the power feeding mounting hole 71*f*, and a pair of positioning holes 71*g*. The socket body 71 is sectioned from the socket heat dissipation part 72 side, that is, the rear side in the optical axis direction by the bottom wall 71*c*. The peripheral wall 71*a* extends in the optical axis direction and is formed in a cylindrical shape with an outer diameter slightly smaller than the inner diameter of the mounting hole 11*a* of the lamp housing 11. The flange wall 71*b* is formed in the shape of a flat plate protruding outward from the rear side of the peripheral wall 71*a* in the direction perpendicular to the optical axis direction over the overall circumference. The bottom wall 71*c* closes the rear side of the cylindrical peripheral wall 71*a*. In other words, the bottom wall 71*c* corresponds to a bottom surface of the socket body 71.

Each mounting protrusion 71*d* is formed in such a projecting shape as to protrude forward with respect to the flange wall 71*b* and outward from the peripheral wall 71*a* in the direction perpendicular to the optical axis direction. The four mounting protrusions 71*d* are provided at equal intervals in the peripheral direction of the peripheral wall 71*a* and can pass through cutout parts provided in the mounting hole 11*a* of the lamp housing 11. Each mounting protrusion 71*d* passes through the above cutout part, and thereafter the rotational posture of the socket body 71 relative to the lamp housing 11 is changed to use each mounting protrusion as a stopper part, so that a peripheral edge portion of the mounting hole 11*a* and the sealing member 15 can be sandwiched between the mounting protrusions and the flange wall 71*b* (see FIG. 1). Consequently, each mounting protrusion 71*d* cooperates with the flange wall 71*b* to removably mount the socket 7, that is, the light source unit 2, on the lamp housing 11 via the sealing member 15.

The groove 71*e*, the power feeding mounting hole 71*f*, and the positioning holes 71*g* are formed inside the cylindrical peripheral wall 71*a*.

The groove 71*e* is a portion into which the fin part 43 of the heat dissipation member 4 is fitted, and is formed in the shape of the inverted fin part 43. The groove 71*e* is formed by a plurality of wall parts 71*e*1 and a bottom wall 71*c* corresponding to a groove bottom. The groove 71*e* consists of parallel grooves 71*e*2, which fit the four parallel fins 43*a*, and connecting grooves 71*e*3, which fit two connecting fins 43*b*, assembled in a grid pattern. Therefore, the groove 71*e* can accept the fin part 43 so as to be able to properly engage with the fin part 43. The groove 71*e* is coated with heat-conductive grease 100 (thermal conductor).

The power feeding mounting hole 71*f* is a hole for mounting the power feeding member 5, and the bottom wall 71*c* penetrates in the optical axis direction. The power feeding mounting hole 71*f* is formed so as to model an outer shape of the power feeding insulating part 52 (except the insulating one end surface 52*a* and the insulating other end surface 52*b*). An insulation property of the power feeding member 5 is ensured by fitting the power feeding member 5 into the power feeding mounting hole 71*f* through an insulating material. When the power feeding member 5 is fitted into the power feeding mounting hole 71*f*, the terminal other end portions 51*b* are exposed on the rear side of the socket 7. The power supply side connector 6 is mounted on the terminal other end portions 51*b*, so that the terminal other end portions 51*b* are electrically connected to the connector electrode parts 61 (see FIG. 5 and FIG. 11).

The positioning holes 71*g* are portions into which the second protrusions 42*c* are inserted. Each positioning hole 71*g* extends rearward in the optical axis direction and is shaped to allow insertion of the second protrusion 42*c*. The positioning holes 71*g* are disposed outside the power feeding mounting hole 71*f* in the width direction and between the groove 71*e* and the power feeding mounting hole 71*f* in the up-down direction. Each of the positioning holes 71*g* can define a relative position of the heat dissipation member 4 and the socket 7 when each second protrusion 42*c* is inserted. In other words, the second protrusions 42*c* are the positioning parts on the heat dissipation member 4 side and the positioning holes 71*g* are the positioning parts on the socket 7 side. As long as the second protrusion 42*c* and the positioning holes 71*g* define the relative positions of the heat dissipation member 4 and the socket 7, the position and the number of holes can be set appropriately, for example, the protrusions and the holes can be replaced, and the configuration is not limited to that of Embodiment 1.

The socket heat dissipation part 72 releases (radiates) the heat conducted from the heat dissipation member 4 to the outside through the socket body 71. The socket heat dissipation part 72 has a plurality of socket fins 72*a* The socket fins 72*a* protrude toward the rear side in the optical axis direction from rear surfaces of the flange wall 71*b* and the bottom wall 71*c* and are formed in a plate shape along a plane perpendicular to the width direction. The socket fins 72*a* are provided in parallel at predetermined intervals in the width direction. There is a portion provided with no socket fin 72*a* on the rear and lower side of the socket heat dissipation part 72 (see FIG. 11). The portion provided with no socket fin 72*a* is provided with fitting part (no illustrated) where the power supply side connector 6 is fitted. The fitting part is mechanically and removably mounted with the power supply side connector 6. The power supply side connector 6 is mounted on the fitting part, so that the power supply side connector 6 is fixed to the socket 7, and the power supply side connector 6 and the power feeding member 5 are electrically connected to each other.

Now, a main part configuration of the heat dissipation member 4 will be described with reference to FIG. 4 to FIG. 9.

Figure 4:
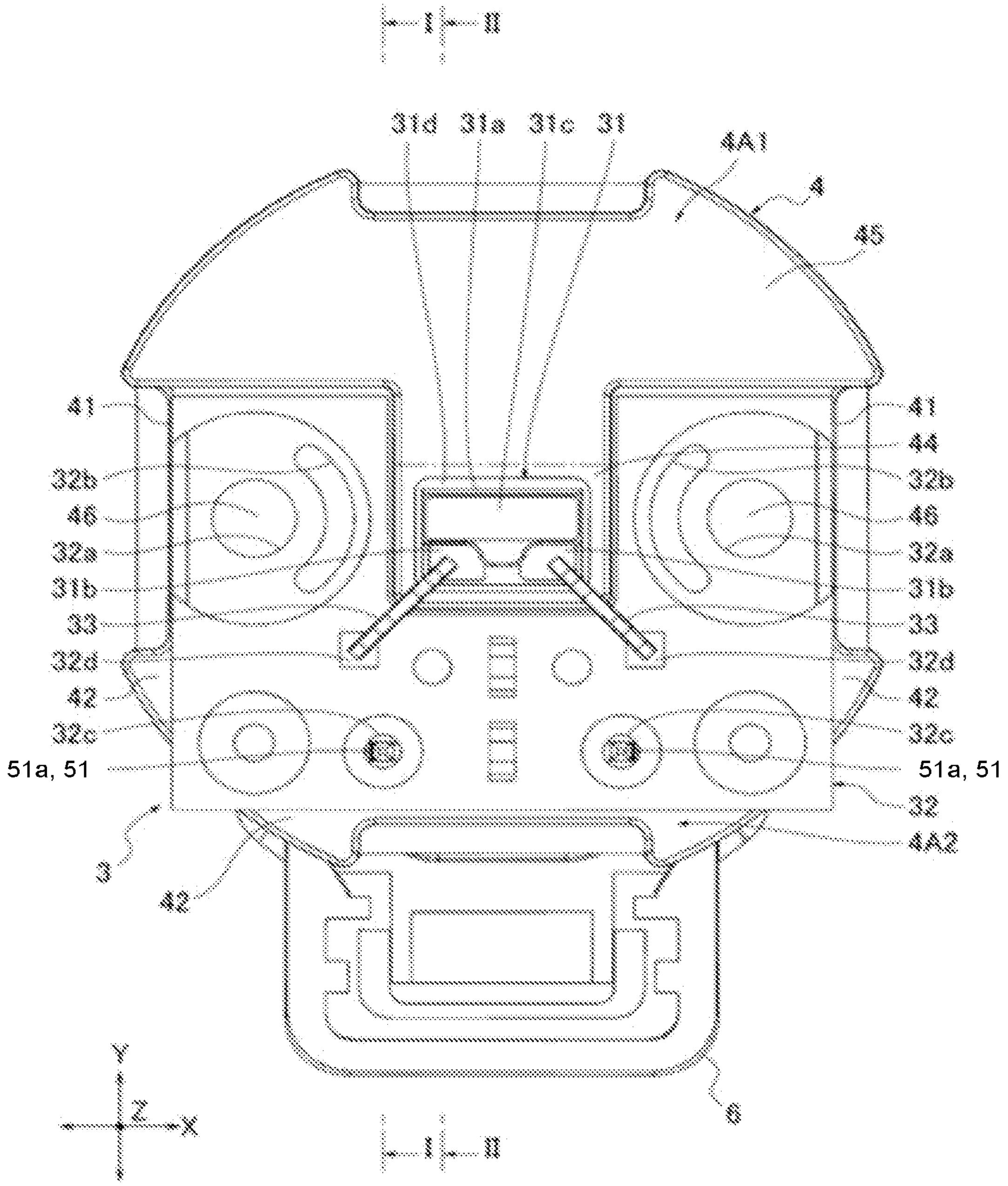
FIG. 4 is an explanatory diagram illustrating a light source part, a heat dissipation member, a power feeding member, and a power supply side connector of the present disclosure.

With reference to FIG. 4 and FIG. 7, a region of the overall front surface 4A of the heat dissipation member 4 will be described.

The overall front surface 4A of the heat dissipation member 4 will be divided as follows. The overall front surface 4A of the heat dissipation member 4 is divided into an extension support region 4Ae and a remaining base region 4Aa (remaining area). The extension support region 4Ae is the extension support unit 42 and is set to the lower side in the up-down direction with respect to the light-emitting region 4Af (see below) when mounted on a vehicle. The base region 4Aa is the base part 41 and is the overall base front surface 41A of the base part 41.

The overall front surface 4A of the heat dissipation member 4 is divided into the light-emitting region 4Af, a circuit substrate region 4Ag (substrate region), and the extension light-emitting region 4Ah. The light-emitting region 4Af is the first projection part 44, and a region where the light-emitting element 31 is mounted. The circuit substrate region 4Ag is a portion of the base part 41 and the extension support unit 42, and is a region where the circuit substrate 32 is mounted. The circuit substrate region 4Ag is a region that includes the extension support region 4Ae. In other words, a portion of the circuit substrate region 4Ag overlaps with the extension support region 4Ae. The extension light-emitting region 4Ah is the second projection part 45, and an extended region of the light-emitting region 4Af.

The extension light-emitting region 4Ah is set to the upper side in the up-down direction with respect to the light-emitting region 4Af when mounted on a vehicle. The extension light-emitting region 4Ah is a region where nothing is mounted.

The base region 4Aa is a region where the light-emitting region 4Af, the extension light-emitting region 4Ah, and a caulked region 4Aj are combined. The caulked region 4Aj is a region where hole parts 32*a*, the curved hole parts 32*b*, and the positioning protrusion parts 46 are disposed and the positioning protrusion parts 46 are caulked. In other words, the caulked region 4Aj is a region where the extension support region 4Ae is not included from the circuit substrate region 4Ag. The circuit substrate region 4Ag is a region where the extension support region 4Ae and the caulked region 4Aj are combined.

With reference to FIG. 6 to FIG. 9, the thickness (dimensions) in the optical axis direction of the heat dissipation member 4 will be described. The thickness (dimensions) in the optical axis direction of the heat dissipation member 4 is the thickness of the heat dissipation member 4 which does not include the fin part 43 and the positioning protrusion parts 46.

The thickness 40*e* of the extension support region 4Ae is set thinner than the thickness 40*a* of the base region 4Aa (thickness of the remaining region). In other words, the thickness 40*e* of the extension support region 4Ae is set thinner than any of the thickness 40*f* of the light-emitting region 4Af, the thickness 40*h* of the extension light-emitting region 4Ah, and the thickness 40*j* of the caulked region 4Aj.

The thickness 40*f* of the light-emitting region 4Af is set to be the same as the thickness 40*h* of the extension light-emitting region 4Ah. Of the overall front surface 4A of the heat dissipation member 4, the light-emitting region 4Af and the extension light-emitting region 4Ah are contiguous regions on the front surface 4A, and are the same plane (flush) on the front side. The light-emitting region 4Af and the extension light-emitting region 4Ah are adjacent to each other with no spacing therebetween.

The thickness 40*f* of the light-emitting region 4Af and the thickness 40*h* of the extension light-emitting region 4Ah are set thicker than the thickness 40*g* of the circuit substrate region 4Ag. In other words, the thickness 40*f* of the light-emitting region 4Af and the thickness 40*h* of the extension light-emitting region 4Ah are set thicker than both the thickness 40*e* of the extension support region 4Ae and the thickness 40*j* of the caulked region 4Aj.

The thickness 40*j* of the caulked region 4Aj is set thicker than the thickness 40*e* of the extension support region 4Ae. The thickness 40*j* of the caulked region 4Aj is set thinner than the thickness 40*f* of the light-emitting region 4Af and the thickness 40*h* of the extension light-emitting region 4Ah by the thickness 40*k* of the first projection part 44 and the second projection part 45 (thickness and step of the projecting surface portion 4A1). Of the overall front surface 4A of the heat dissipation member 4, the extension support region 4Ae and the caulked region 4Aj are continuous regions on the front surface 4A and are the same plane (flush) on the front side. The extension support region 4Ae and the caulked region 4Aj are adjacent to each other with no spacing therebetween. The thickness 40*e* of the extension support region 4Ae is set thinner by the thickness 40*m* than the thickness 40*j* of the caulked region 4Aj.

Herein, on the overall front surface 4A of the heat dissipation member 4, the light-emitting region 4Af and the extension light-emitting region 4Ah are the projecting surface portion 4A1, while the circuit substrate region 4Ag (the extension support region 4Ae and the caulked region 4Aj) is the recessed surface portion 4A2. In other words, the light-emitting region 4Af and the extension light-emitting region 4Ah are each formed in such a projecting shape that the front surface 4A of the heat dissipation member 4 protrude with respect to the circuit substrate region 4Ag. When the circuit substrate 32 is mounted on the circuit substrate region 4Ag, the circuit substrate 32 protrudes forward with respect to the first projection part 44 (see FIG. 6). Furthermore, when the light-emitting element 31 is mounted on the light-emitting region 4Af, the position of each light-emitting electrode part 31*b* is on the front side in the optical axis direction with respect to the position of the substrate electrode part 32*d* (see FIG. 6). In the optical axis direction, the thickness of the circuit substrate 32 is set thinner than the thickness obtained by adding the thickness of the first projection part 44 to the thickness of the light-emitting element 31 (see FIG. 6). In other words, the thickness 40*k* of the first projection part 44 in the optical axis direction is determined on the basis of the thickness of the circuit substrate 32 in the optical axis direction.

Now, action of Embodiment 1 will be divided into "assembly action of the light source unit 2," "support rigidity action of the terminal connection hole parts 32*c*," "action of the extension support unit 42," "heat dissipation basic action of the vehicle lighting unit 1," and "heat dissipation feature action of the vehicle lighting unit 1" to be described.

Now, the assembly action of the light source unit 2 will be described.

First, as illustrated in FIG. 3, the power feeding member 5 is fitted into the power feeding mounting hole 71*f* of the socket 7 through an insulating material.

Now, attachment of the light source part 3 to the heat dissipation member 4 will be described with reference to FIG. 4 and FIG. 7. First, the light-emitting element 31 is mounted on the light-emitting region 4Af by the adhesive agent 31*d*. Then, the circuit substrate 32 is mounted on the circuit substrate region 4Ag by the adhesive sheet 32*e*. When mounting the circuit substrate 32, cutout portions in the adhesive sheet 32*e* are aligned with the terminal insertion hole parts 42*a* and the positioning protrusion parts 46. Next, the positioning protrusion parts 46 are inserted into the caulking hole parts 32*a* and the terminal connection hole parts 32*c* and the terminal insertion hole parts 42*a* are aligned. Thereafter, tips of the positioning protrusion parts 46 are crushed, so that the positioning protrusion parts 46 are plastically deformed. That is, the positioning protrusion parts 46 are caulked. Consequently, the circuit substrate 32 is fixed to the heat dissipation member 4. Next, the left and right light-emitting electrode parts 31*b* and the left and right substrate electrode parts 32*d* are connected respectively by wire bonding using ultrasonic waves. When connected, the two ends of each bonding wire 33 applied to each light-emitting electrode part 31*b* and each substrate electrode part 32*d* are electrically connected by wire bonding using ultrasonic waves.

With reference to FIG. 3, FIG. 10 and FIG. 12, assembly of the heat dissipation member 4 and the socket 7 will be then described.

Next, the heat-conductive grease 100 (heat conductor) is applied to the groove 71*e* of the socket 7. Herein, the heat-conductive grease 100 is used to enhance thermal conductivity between the fin part 43 of the heat dissipation member 4 and the groove 71*e*. Each second protrusion 42*c* is then inserted into the positioning hole 71*g*. Then, ultrasonic waves are used to press-fit the heat dissipation member 4 into the socket 7. During press-fitting, the fin part 43 is fitted into the groove 71*e* by the positioning action of each second protrusion 42*c* and each positioning hole 71*g*. Furthermore, by the same action, each terminal one end portion 51*a* of the power feeding member 5 is inserted into the terminal connection hole part 32*c* after being inserted into the terminal insertion hole part 42*a*. The insulating one end surface 52*a* of the power feeding insulating part 52 is then brought into contact with the pair of first protrusions 42*b*. A portion (tip) of each terminal one end portion 51*a* protrudes from the terminal connection hole part 32*c* slightly forward with respect to the front surface of the circuit substrate 32.

Then, as illustrated in FIG. 2 and FIG. 4, each of the terminal one end portions 51*a* is electrically connected to the terminal connection hole part 32*c* using solder (not illustrated) on the front side of the terminal connection hole part 32*c*. Thus, the light source unit 2 is assembled.

Then, the sealing member 15 is mounted on the flange wall 71*b* while being wrapped around the peripheral wall 71*a*, as illustrated in FIG. 1 to FIG. 3. Next, in a state in which the sealing member 15 is attached, the light source unit 2 is inserted into the mounting hole 11*a* of the lamp housing 11 from the light-emitting part 31*c* side. Then, each mounting protrusion 71*d* of the socket 7 passes through the cutout part provided on an edge of the mounting hole 11*a*. Next, the rotational posture of the socket body 71 relative to the lamp housing 11 is changed. Each mounting protrusion 71*d* is applied to a corresponding stopper part. Consequently, the light source unit 2 is mounted on the lamp housing 11 in a state in which the sealing member 15 is sandwiched between the flange wall 71*b* and a peripheral edge of the mounting hole 11*a*. Thereafter, the reflector 13 and the lamp lens 12 are mounted on the lamp housing 11. Thus, the vehicle lighting unit 1 is assembled.

Consequently, in the vehicle lighting unit 1, the light source part 3 is disposed inside the lamp chamber 14 through the mounting hole 11*a* of the lamp housing 11 and the mounting hole 13*b* of the reflector 13, and is disposed on the reflection surface 13*a* side of the reflector 13. In the vehicle lighting unit 1, the power supply side connector 6 connected to the harnesses 16 is mounted on the fitting part of the socket 7 (see FIG. 1). Consequently, power can be supplied to the light-emitting element 31 from the circuit substrate 32 via the power feeding member 5, and the light-emitting part 31*c* can be turned on and off.

Now, support rigidity action of the terminal connection hole parts 32*c* will be described.

The present disclosure focuses on an issue that the support rigidity of the substrate connection part in the vertical direction (optical axis direction) is not ensured in a conventional vehicle lighting unit. When the support rigidity of the substrate connection part is not ensured, the substrate connection part or its surroundings may be damaged when connecting the substrate and the power feeding member, or the connection state between the substrate and the power feeding member may be broken by external vibration.

On the other hand, in Embodiment 1, the circuit substrate 32 and the power feeding member 5 are electrically connected by the terminal connection hole parts 32*c*, as illustrated in FIG. 5 and other drawings. The heat dissipation member 4 integrally has an extension support unit 42 that supports the terminal connection hole parts 32*c* in placement in the optical axis direction of the heat dissipation member 4. That is, the extension support unit 42 is formed by extending the base part 41 downward, and therefore the number of components does not need to be increased. Furthermore, the rear side (socket 7 side) of the terminal connection hole parts 32*c* is supported by the extension support unit 42 in the placement in the optical-axis direction of the heat dissipation member 4. In other words, the extension support unit 42 takes on the support force of the rear side of the terminal connection hole parts 32*c*. As a result, the support rigidity of the terminal connection hole parts 32*c* in the optical axis direction is ensured without increasing the number of components. Consequently, it is possible to suppress the risk of damage to the terminal connection hole parts 32*c* or its surroundings, or the risk of disconnection of the circuit substrate 32 from the power feeding member 5 due to external vibration. Furthermore, the number of components does not need to be increased, and therefore the support rigidity of the terminal connection hole parts 32*c* in the optical axis direction is secured without increasing the number of assembly steps.

Now, action of the extension support unit 42 will be described.

In Embodiment 1, as illustrated in FIG. 7, FIG. 8 and other drawings, the thickness 40*e* of the extension support region 4Ae is set thinner than the thickness 40*a* of the base region 4Aa, of the thickness in the optical axis direction of the heat dissipation member 4. Herein, the portions (terminal connection hole parts 32*c*) where the circuit substrate 32 (terminal connection hole parts 32*c*) and the power feeding member 5 (terminal one end portions 51*a*) are connected at the extension support unit 42 via solder is a portion where the heat dissipation property is not required as the heat dissipation member 4 (or where heat dissipation is relatively low). Consequently, the thickness 40*e* of the extension support region 4Ae can be set thinner than the thickness 40*a* of the base region 4Aa. Therefore, the support rigidity of the terminal connection hole parts 32*c* in the optical axis direction is ensured while the inherent heat dissipation property of the heat dissipation member 4 is maintained.

Furthermore, in Embodiment 1, the heat dissipation member 4 integrally has the base part 41 and the extension support unit 42. The extension support unit 42 is provided integrally at a front end portion of the base part 41 and below the base part 41 in the up-down direction. Consequently, an assembly space is ensured on the rear side of the extension support unit 42 by at least the thickness 40*m*. Therefore, it is possible to enhance freedom in the positioning of the power feeding member 5 in relation to the terminal connection hole parts 32*c*.

Furthermore, in Embodiment 1, as illustrated in FIG. 5, FIG. 10, and other drawings, the extension support unit 42 has the terminal insertion hole parts 42*a* that penetrate in the optical axis direction and the first protrusions 42*b* formed by protruding the extension support rear surface 42B. Consequently, the first protrusions 42*b* are brought into contact with the insulating one end surface 52*a* of the power feeding insulating part 52 when the terminal one end portions 51*a* are inserted into the terminal insertion hole parts 42*a*. Therefore, when assembling the power feeding member 5, the assembly position of the power feeding member 5 can be determined by the first protrusions 42*b*.

The heat dissipation basic action of the vehicle lighting unit 1 will be described.

Figure 6:
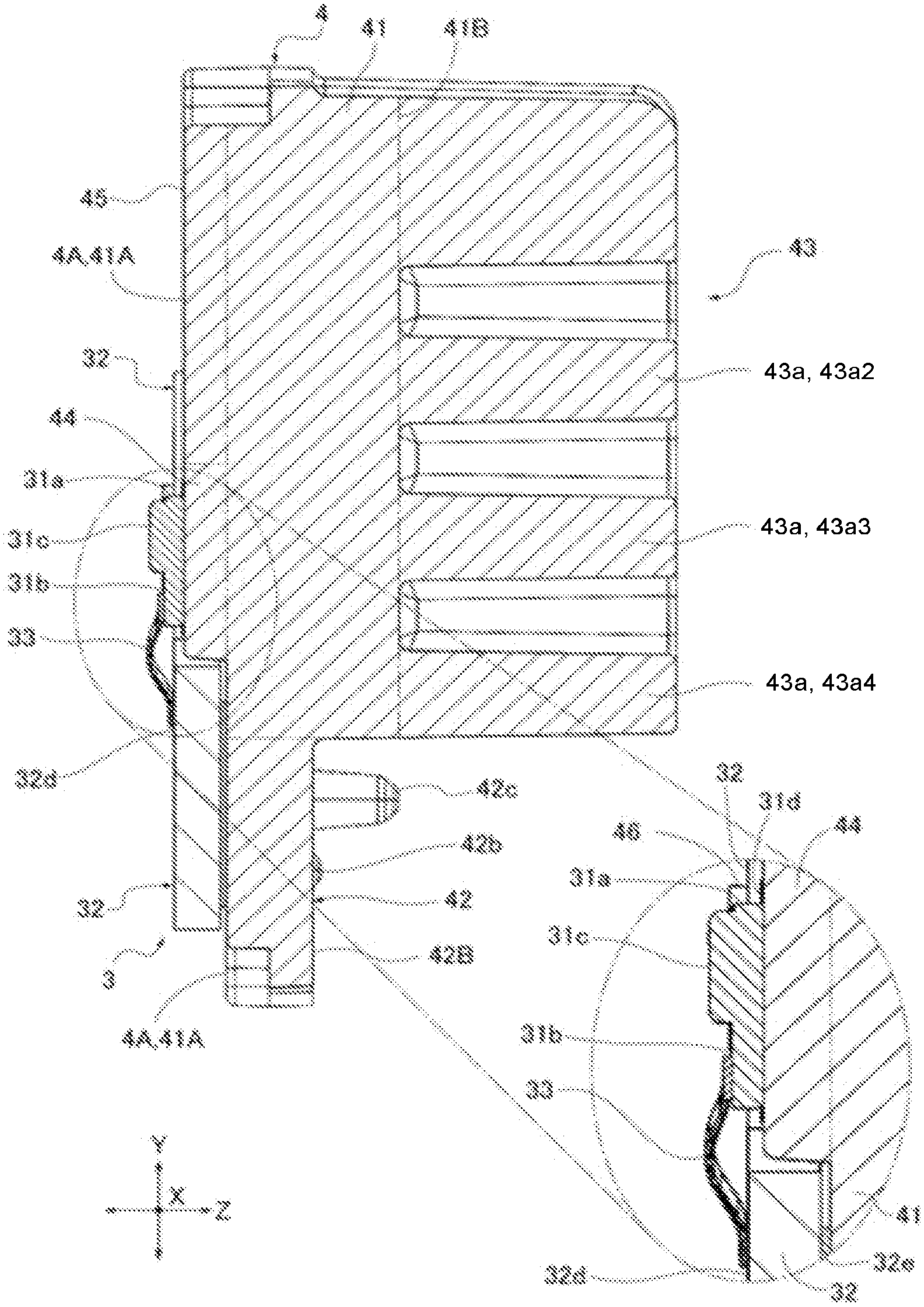
FIG. 6 is a sectional view illustrating a cross section of the light source part and the heat dissipation member of the present disclosure, excluding the power feeding member and the power supply side connector from the sectional view taken along a II-II line in FIG. 4.

As illustrated in FIG. 6 and other drawings, in the vehicle lighting unit 1, the light-emitting element 31 is directly provided in the heat dissipation member 4. Furthermore, the fin part 43 of the heat dissipation member 4 is fitted into the groove 71*e* of the socket 7. Consequently, heat generated from the light-emitting element 31 is directly conducted to the heat dissipation member 4. The heat conducted to the heat dissipation member 4 is then conducted from the fin part 43 to the socket 7 via the groove 71*e*. Then, the heat conducted to the socket 7 is dissipated from the socket 7 to the outside.

Therefore, in the vehicle lighting unit 1, the light-emitting element 31 can be properly cooled, and the light-emitting element 31 can be properly turned on and off. Furthermore, the light-emitting element 31 is directly provided in the heat dissipation member 4, and therefore Embodiment 1 has an advantage in terms of the heat dissipation property of the light-emitting element 31 (higher heat dissipation property) compared to the substrate-mounting type. Furthermore, the socket 7 is provided with the socket fin 72*a*, and therefore the heat conducted from the heat dissipation member 4 to the socket 7 can be efficiently dissipated to the outside. Consequently, it is possible to promote the heat dissipation property of the heat dissipation member 4. The substrate-mounting type has a light-emitting chip mounted on a mounting surface, which is a top surface of a substrate, and a metal body disposed on the lower side of the substrate, as in the past (Japanese Patent Laid-open No. 2013-247062). In other words, the substrate is interposed between the light-emitting chip and the metal body.

Now, the heat dissipation feature action of the vehicle lighting unit 1 will be described.

In recent years, the use of LEDs in the vehicle lighting unit is increased, and the importance of the heat dissipation property of heat generated by LEDs has been growing. However, by the miniaturization of components due to new design and the reduction in the number of components due to cost, higher output and higher brightness in a single LED are demanded. In addition, the heat generated by the LEDs is increasing as the output of LEDs increases, and the promotion (efficiency improvement) of a heat dissipation property is desired as an issue.

On the other hand, in Embodiment 1, as illustrated in FIG. 7, FIG. 8, and other drawings, of the thickness in the optical axis direction of the heat dissipation member 4, the thickness 40*f* of the light-emitting region 4Af is set thicker than the thickness 40*g* of the circuit substrate region 4Ag. That is, the heat capacity of the thickness 40*f* of the light-emitting region 4Af is larger than that of the thickness 40*g* of the circuit substrate region 4Ag. Consequently, it is possible to slow the temperature rise rate of the surroundings of the light-emitting region 4Af, and therefore heat generated from the light-emitting element 31 is easily conducted to the heat dissipation member 4 by thermal conduction action. Therefore, the temperature rise of the light-emitting element 31 is suppressed, and the heat dissipation property of heat generated from the light-emitting element 31 is promoted.

Furthermore, in Embodiment 1, the light-emitting region 4Af is formed in such a projecting shape that the front surface 4A of the heat dissipation member 4 protrudes with respect to the circuit substrate region 4Ag. Herein, for example, when the surfaces on which the light-emitting element 31 and the circuit substrate 32 are mounted are on the same plane, light emitted by the light-emitting element 31 may be cut by the circuit substrate 32. On the other hand, in Embodiment 1, the light-emitting element 31 is mounted on the light-emitting region 4Af, and the circuit substrate 32 is mounted on the circuit substrate region 4Ag, and therefore the light-emitting element 31 (specifically, the light-emitting part 31*c*) is located on the front side with respect to the circuit substrate 32. Therefore, emission light from the light-emitting element 31 (specifically, the light-emitting part 31*c*) is less likely to be cut by the circuit substrate 32. In other words, it is more advantageous in designing light distribution (easier to design light distribution) compared to a case where the light-emitting region 4Af and the circuit substrate region 4Ag are on the same plane. In addition, the light-emitting electrode parts 31*b* of the light-emitting element 31 are located on the front side with respect to the substrate electrode parts 32*d*, thereby making wire bonding easier.

In Embodiment 1, as illustrated in FIG. 7 to FIG. 9, and other drawings, of the thickness in the optical axis direction of the heat dissipation member 4, the thickness 40*f* of the light-emitting region 4Af and the thickness 40*h* of the extension light-emitting region 4Ah are set thicker than the thickness 40*g* of the circuit substrate region 4Ag. The light-emitting region 4Af and the extension light-emitting region 4Ah are formed in such a projecting shape that the front surface 4A of the heat dissipation member 4 protrudes with respect to the circuit substrate region 4Ag. The light-emitting region 4Af and the extension light-emitting region 4Ah are contiguous regions at the front surface 4A of the heat dissipation member 4. That is, in addition to the heat capacity of the thickness 40*f* of the light-emitting region 4Af, the heat capacity of the thickness 40*h* of the extension light-emitting region 4Ah is set larger than that of the thickness 40*g* of the circuit substrate region 4Ag, and the light-emitting region 4Af and the extension light-emitting region 4Ah are continuous regions. Consequently, the temperature rise rate of the surroundings of the light-emitting region 4Af can be slowed down by the heat capacity of the thickness 40*h* of the extension light-emitting region 4Ah. Therefore, heat generated from the light-emitting element 31 is easily conducted from the light-emitting region 4Af to the heat dissipation member 4 (especially, the second projection part 45 which is the extension light-emitting region 4Ah) by thermal conduction action. Accordingly, the temperature rise of the light-emitting element 31 is further suppressed, and the heat dissipation property of the heat generated from the light-emitting element 31 is further promoted.

In Embodiment 1, the extension light-emitting region 4Ah is set on the upper side in the up-down direction with respect to the light-emitting region 4Af when mounted on a vehicle. That is, the placement of the extension light-emitting region 4Ah is set with attention to the fact that heat is conducted from the lower side to the upper side and that heat is conducted toward the side with the larger heat capacity. In other words, the heat capacity of the upper side (thickness 40*h* of the extension light-emitting region 4Ah) with respect to the light-emitting element 31 which generates heat is set larger than that of the lower side (thickness 40*g* of the circuit substrate region 4Ag). Consequently, the heat generated from the light-emitting element 31 is easily conducted toward the extension light-emitting region 4Ah (second projection part 45) through the light-emitting region 4Af Therefore, it is possible to further slowdown the temperature rise rate of the surroundings of the light-emitting region 4Af, and the heat generated from the light-emitting element 31 is easily conducted to the heat dissipation member 4 by thermal conduction action. Accordingly, the temperature rise of the light-emitting element 31 is further suppressed, and the heat dissipation property of the heat generated from the light-emitting element 31 is further promoted. The extension support region 4Ae is set on the lower side in the up-down direction with respect to the light-emitting region 4Af when mounted on a vehicle since the heat dissipation property is not required as described above.

Furthermore, in Embodiment 1, of the overall front surface 4A of the heat dissipation member 4, the light-emitting region 4Af and the extension light-emitting region 4Ah are on the same plane. The extension light-emitting region 4Ah is a region where nothing is mounted. Consequently, emission light from the light-emitting part 31*c* is less likely to be cut by the extension light-emitting region 4Ah. Therefore, it is more advantageous in designing light distribution (easier to design light distribution) compared to a case where the extension light-emitting region 4Ah is a region where something is mounted.

In Embodiment 1, as illustrated in FIG. 2, FIG. 4, and other drawings, the heat dissipation member 4 has the positioning protrusion parts 46 inserted into the caulking hole parts 32*a* and caulked. That is, when the circuit substrate 32 is mounted on the heat dissipation member 4, the circuit substrate 32 is easily positioned with respect to the heat dissipation member 4 by insertion of the positioning protrusion parts 46 into the caulking hole parts 32*a*. Furthermore, after the positioning protrusion parts 46 are inserted into the caulking hole parts 32*a*, the positioning protrusion parts 46 are caulked, and therefore the circuit substrate 32 is mounted on the heat dissipation member 4. Consequently, the circuit substrate 32 is prevented from falling off from the heat dissipation member 4 due to vibration in the case of wire bonding, vibration when the heat dissipation member 4 is fitted into the socket 7, or vehicle vibration. Therefore, the circuit substrate 32 is easily positioned with respect to the heat dissipation member 4, and falling of the circuit substrate 32 from the heat dissipation member 4 is prevented. In addition, in Embodiment 1, the one curved hole part 32*b* is provided one by one between the substrate cutout part 32B and each of the caulking hole parts 32*a*. Consequently, stress which acts on the caulking hole parts 32*a* can be dispersed to the curved hole parts 32*b*. Therefore, it is possible to suppress damage of the circuit substrate 32 when the positioning protrusion parts 46 are caulked.

As described above, the vehicle lighting unit 1 in Embodiment 1 has the following effects.

(1) The vehicle lighting unit 1 includes the light source part 3, the power feeding member 5, the heat dissipation member 4, and the socket 7. The light source part 3 has the light-emitting element 31, and the circuit substrate 32 (substrate) connected to the light-emitting element 31. The power feeding member 5 supplies power to the light source part 3. The heat dissipation member 4 is mounted with the light source part 3. The socket 7 is assembled on the rear side opposite to the front surface 4A of the heat dissipation member 4 mounted with the light source part 3. In the vehicle lighting unit 1, the circuit substrate 32 (substrate) and the power feeding member 5 are electrically connected by the terminal connection hole parts 32*c* (substrate connection part). The heat dissipation member 4 integrally has the extension support unit 42 that supports at least the terminal connection hole parts 32*c* (substrate connection part) in placement in the optical axis direction (front-rear direction) of the heat dissipation member 4. Accordingly, it is possible to provide the vehicle lighting unit 1 capable of ensuring the support rigidity of the terminal connection hole parts 32*c* (substrate connection part) in the optical axis direction without increasing the number of components.

(2) The front surface 4A of the heat dissipation member 4 has the extension support region 4Ae which is the extension support unit 42. Of the thickness in the optical axis direction (front-back direction) of the heat dissipation member 4, the thickness 40*e* of the extension support region 4Ae is set thinner than the thickness 40*a* of the base region 4Aa (thickness of the remaining region). Therefore, in addition to the effect of the above (1), the inherent heat dissipation property of the heat dissipation member 4 can be maintained and the support rigidity of the terminal connection hole parts 32*c* (substrate connection part) in the optical axis direction can be secured.

(3) The front surface 4A of the heat dissipation member 4 has the light-emitting region 4Af where the light-emitting element 31 is mounted, and the circuit substrate region 4Ag (substrate region) where the circuit substrate 32 (substrate) is mounted. The circuit substrate region 4Ag (substrate region) includes the extension support region 4Ae which is the extension support unit 42. Of the thickness in the optical axis direction (front-back direction) of the heat dissipation member 4, the thickness 40*f* of the light-emitting region 4Af is set thicker than at least the thickness 40*g* of the circuit substrate region 4Ag (thickness of the substrate region). Therefore, in addition to the effects of the above (1) to (2), the temperature rise of the light-emitting element 31 can be suppressed and the heat dissipation property of the heat generated from the light-emitting elements 31 can be promoted.

(4) Of the front surface 4A of the heat dissipation member 4, the light-emitting element 31 and the circuit substrate 32 (substrate) are mounted on different regions. The front surface 4A of the heat dissipation member 4 has the light-emitting region 4Af where the light-emitting element 31 is mounted and the circuit substrate region 4Ag (substrate region) where the circuit substrate 32 (substrate) is mounted. The circuit substrate region 4Ag (substrate region) includes the extension support region 4Ae which is the extension support unit 42. Of the thickness in the optical axis direction (front-back direction) of the heat dissipation member 4, the thickness 40*f* of the light-emitting region 4Af is set thicker than at least the thickness 40*g* of the circuit substrate region 4Ag (thickness of the substrate region). The light-emitting region 4Af is formed in such a projecting shape that the front surface 4A of the heat dissipation member 4 protrudes with respect to at least the circuit substrate region 4Ag (substrate region). Therefore, in addition to the effects of the above (1) to (3), the emission light from the light-emitting element 31 (specifically, the light-emitting part 31*c*) is less likely to be cut by the circuit substrate 32 (substrate).

(5) The front surface 4A of the heat dissipation member 4 has the light-emitting region 4Af, the circuit substrate region 4Ag (substrate region), and the extension light-emitting region 4Ah that extends the light-emitting region 4Af. Of the thickness in the optical axis direction (front-back direction) of the heat dissipation member 4, the thickness 40*f* of the light-emitting region 4Af and the thickness 40*h* of the extension light-emitting region 4Ah are set thicker than at least the thickness 40*g* of the circuit substrate region 4Ag (thickness of the substrate region). The light-emitting region 4Af and the extension light-emitting region 4Ah are formed in such a projecting shape that the front surface 4A of the heat dissipation member 4 protrudes with respect to at least the circuit substrate region 4Ag (substrate region) and are continuous regions at the front surface 4A of the heat dissipation member 4. Therefore, in addition to the effect of the above (4), the temperature rise of the light-emitting element 31 can be further suppressed and the heat dissipation property of the heat generated from the light-emitting element 31 can be further promoted.

(6) The extension light-emitting region 4Ah is set on the upper side in the up-down direction (vertical direction) with respect to the light-emitting region 4Af when mounted on a vehicle. Therefore, in addition to the effect of the above (5), the temperature rise of the light-emitting element 31 can be further suppressed and the heat dissipation property of the heat generated from the light-emitting element 31 can be further promoted.

(7) The circuit substrate 32 (substrate) has the caulking hole parts 32*a* (hole parts). The heat dissipation member 4 has the positioning protrusion parts 46 inserted into the caulking hole parts 32*a* (hole parts) to be caulked. Therefore, in addition to the effects of the above (4) to (6), the circuit substrate 32 (substrate) can be easily positioned with respect to the heat dissipation member 4 and the falling of the circuit substrate 32 (substrate) from the heat dissipation member 4 can be prevented.

Thus, the vehicle lighting unit 1 of the present disclosure will be described on the basis of Embodiment 1. The specific configuration is not limited to this embodiment, and design changes, additions, or the like are permitted as long as they do not depart from the gist of the invention claimed in each claim.

The substrate connection part of the circuit substrate 32 that electrically connects the circuit substrate 32 and the power feeding member 5 by solder is the terminal connection hole parts 32*c* in Embodiment 1, but is not limited to this. For example, the substrate connection part of the circuit substrate 32 may be a plate-like terminal. In short, the circuit substrate 32 and the power feeding member 5 should be electrically connected. This configuration also achieves the effects described in the above (1) to (7).

The extension support unit 42 supports the terminal connection hole parts 32*c* and the surroundings of the terminal connection hole parts 32*c* (a portion of the circuit substrate 32) in Embodiment 1, but is not limited to this. In short, the extension support unit 42 should support at least the substrate connection part that electrically connects the circuit substrate 32 and the power feeding member 5 in placement in the optical-axis arrangement of the heat dissipation member 4. This configuration also achieves the effects described in the above (1) to (7).

The overall front surface 4A of the heat dissipation member 4 is divided into the base region 4Aa, the extension support region 4Ae, the light-emitting region 4Af, the circuit substrate region 4Ag, the extension light-emitting region 4Ah, and the caulked region 4Aj in Embodiment 1, but is not limited to this. For example, the position and the size of these regions may be changed, or other regions may be added to these regions. This configuration also achieves at least the effects described in the above (1) to (5) and (7).

The remaining region is the base region 4Aa in Embodiment 1, but is not limited to this. In short, the thickness 40*e* of the extension support region 4Ae of the front surface 4A of the heat dissipation member 4 should be thinner than the thickness of the remaining region. This configuration also achieves at least the effects described in the above (1) to (2).

The thickness 40*f* of the light-emitting region 4Af is set thicker than the thickness 40*g* of the circuit substrate region 4Ag in Embodiment 1. In addition, the thickness 40*f* of the light-emitting region 4Af is set to be the same as the thickness 40*h* of the extension light-emitting region 4Ah. However, the present disclosure is not limited to this. For example, the thickness 40*f* of the light-emitting region 4Af may be set thicker than the thickness 40*g* of the circuit substrate region 4Ag and the thickness 40*h* of the extension light-emitting region 4Ah (the thickness of the remaining region excluding the light-emitting region 4Af). This configuration also achieves at least the effects described in the above (1) to (4).

The light-emitting region 4Af is formed in such a projecting shape that the front surface 4A of the heat dissipation member 4 protrudes with respect to the circuit substrate region 4Ag in Embodiment 1, but is not limited to this. For example, the light-emitting region 4Af may be formed in such a projecting shape that the front surface 4A of the heat dissipation member 4 protrudes with respect to the circuit substrate region 4Ag and the extension light-emitting region 4Ah. For example, the extension light-emitting region 4Ah may not be formed in such a projecting shape that the front surface 4A of the heat dissipation member 4 protrudes. This configuration also achieves at least the effects described in the above (1) to (4). Furthermore, the light-emitting region 4Af may not be formed in such a projecting shape that the front surface 4A of the heat dissipation member 4 protrudes with respect to the circuit substrate region 4Ag. For example, the light-emitting region 4Af may be formed in such a projecting shape that a rear surface opposite to the front surface 4A of the heat dissipation member 4 protrudes with respect to at least the circuit substrate region 4Ag. This configuration also achieves at least the effects described in the above (1) to (3).

The thickness 40*h* of the extension light-emitting region 4Ah is set to be the same thickness as the thickness 40*f* of the light-emitting region 4Af and thicker than the thickness 40*g* of the circuit substrate region 4Ag in Embodiment 1, but is not limited to this. For example, the thickness 40*h* of the extension light-emitting region 4Ah may be set thinner than the thickness 40*f* of the light-emitting region 4Af and thicker than the thickness 40*g* of the circuit substrate region 4Ag, or thicker than the thickness 40*f* of the light-emitting region 4Af. In other words, the light-emitting region 4Af and the thickness 40*h* of the extension light-emitting region 4Ah may not be flush on the front side. This configuration also achieves at least the effects described in the above (1) to (5).

The extension light-emitting region 4Ah is on the upper side in the up-down direction with respect to the light-emitting region 4Af when mounted on a vehicle in Embodiment 1, but is not limited to this. For example, the extension light-emitting region 4Ah may be set on the lower side in the up-down direction with respect to the light-emitting region 4Af or on both sides in the width direction of a vehicle when mounted on the vehicle. This configuration also achieves at least the effects described in the above (1) to (5).

The heat dissipation member 4 has the fin part 43 that protrudes rearward from the base rear surface 41B in Embodiment 1, but is not limited to this. For example, the heat dissipation member 4 may not have the fin part 43. This configuration also achieves the effects described in the above (1) to (7). In this configuration, for example, the base rear surface 41B is a flat surface and the groove 71*e* of the socket 7 is a flat surface. The heat-conductive grease 100 is applied to the flat surface of the socket 7, and the heat dissipation member 4 is assembled in the socket 7.

A submount type in which the light-emitting element 31 and the circuit substrate 32 are mounted separately on the heat dissipation member 4 is employed in Embodiment 1, but the present disclosure is not limited to this. For example, the type can be a substrate-mounting type. In other words, the light-emitting element 31 is mounted on the front surface of the circuit substrate 32 and the heat dissipation member 4 is located on the rear side of the circuit substrate 32. In this configuration, the circuit substrate 32 may constitute a control circuit that drives and controls the light-emitting part 31*c*. This configuration also achieves at least the effects described in the above (1) to (3). The submount substrate 31*a* and the circuit substrate 32 in Embodiment 1 should be electrically connected, and are not limited to the configuration of the bonding wires 33 in Embodiment 1.

In Embodiment 1, ultrasonic waves are used and the heat dissipation member 4 is press-fitted into the socket 7. In addition, the heat-conductive grease 100 is applied to the groove 71*e* of the socket 7. However, the present disclosure is not limited to this. For example, instead of ultrasonic press-fitting, press-fitting in which pressure is simply applied in order to press in may be employed. In a case of the press-fitting by ultrasonic waves, the heat-conductive grease 100 may not be applied. This configuration also achieves the effects described in the above (1) to (7).

The vehicle lighting unit 1 of the present disclosure is applied to a reflective type lighting unit using the reflection surface 13*a* (reflector 13) of a vehicle such as an automobile in Embodiment 1. However, the vehicle lighting unit 1 of the present disclosure is not limited to this. The vehicle lighting unit 1 of the present disclosure may be applied to a lighting unit using a projection lens or may be applied to a light guide type lighting unit using a light guide member in front of the light source (light-emitting part 31*c*). In short, the vehicle lighting unit 1 of the present disclosure may be any other vehicle lighting unit for use in a vehicle, as long as the vehicle lighting unit has a light source part, a power feeding member, a heat dissipation member integrally having an extension support unit, and a socket.

DESCRIPTION OF REFERENCE NUMERALS

1 vehicle lighting unit
2 light source unit
3 light source part
31 light-emitting element
31*c* light-emitting part
32 circuit substrate (substrate)
32*a* caulking hole part (hole part)
32*c* terminal connection hole part (substrate connection part)
4 heat dissipation member (heat sink)
4A front surface of heat dissipation member
4Aa base region (remaining region)
4Ae extension support region
4Af light-emitting region
4Ag circuit substrate region
4Ah extension light-emitting region
40*a* thickness of base region
40*e* thickness of extension support region
40*f* thickness of light-emitting region
40*g* thickness of circuit substrate region
40*h* thickness of extension light-emitting region
42 extension support unit
44 first projection part
45 second projection part
46 positioning protrusion part
5 power feeding member (light source side connector)
51 power feeding terminal (electrode pin)
7 socket
X width direction (left-right direction)
Y up-down direction (vertical direction)
Z optical axis direction (front-rear direction)

The invention claimed is:

1. A vehicle lighting unit comprising:

a light source part having a light-emitting element and a substrate connected to the light-emitting element;

a power feeding member that supplies power to the light source part;

a heat dissipation member mounted with the light source part; and a socket assembled on a rear side opposite to a front surface of the heat dissipation member mounted with the light source part, wherein the power feeding member is electrically connected, on an outer side of the heat dissipation member, to the substrate by a substrate connection part that is provided on the substrate, the heat dissipation member integrally has a base part on which the light-emitting element is mounted, and an extension support unit that positions the power feeding member with respect to the substrate connection part at the outer side of the heat dissipation member, the substrate being mounted on the extension support unit and a portion of the base part.

2. The vehicle lighting unit according to claim 1, wherein a front surface of the heat dissipation member has a base region which is the base part, and an extension support region which is the extension support unit, and of a thickness in a front-back direction of the heat dissipation member, a thickness of the extension support region is thinner than a thickness of the base region.

3. The vehicle lighting unit according to claim 1, wherein a front surface of the heat dissipation member has a light-emitting region where the light-emitting element is mounted, and a substrate region where the substrate is mounted, and the substrate region includes an extension support region which is the extension support unit, and of a thickness in a front-back direction of the heat dissipation member, a thickness of the light-emitting region is thicker than at least a thickness of the substrate region.

4. The vehicle lighting unit according to claim 1, wherein of the front surface of the heat dissipation member, the light-emitting element and the substrate are mounted on different regions, the front surface of the heat dissipation member has a light-emitting region where the light-emitting element is mounted and a substrate region where the substrate is mounted, the substrate region includes an extension support region which is the extension support unit, of a thickness in a front-rear direction of the heat dissipation member, a thickness of the light-emitting region is thicker than at least a thickness of the substrate region, and the light-emitting region is formed in such a projecting shape that the front surface of the heat dissipation member protrudes with respect to at least the substrate region.

5. The vehicle lighting unit according to claim 4, wherein the front surface of the heat dissipation member has the light-emitting region, the substrate region, and an extension light-emitting region that extends the light-emitting region, of the thickness in the front-rear direction of the heat dissipation member, the thickness of the light-emitting region and a thickness of the extension light-emitting region are each thicker than at least the thickness of the substrate region, and the light-emitting region and the extension light-emitting region are each formed in such a projecting shape that the front surface of the heat dissipation member protrudes with respect to at least the substrate region and are continuous regions at the front surface of the heat dissipation member.

6. The vehicle lighting unit according to claim 5, wherein the extension light-emitting region is set on an upper side in a vertical direction with respect to the light-emitting region when mounted on a vehicle.

7. The vehicle lighting unit according to claim 4, wherein the substrate has a hole part, and the heat dissipation member has a positioning protrusion part inserted into the hole part to be caulked.

8. The vehicle lighting unit according to claim 1, wherein the heat dissipation member includes a plurality of fins, the plurality of fins being provided on a surface of the base part, which is opposite to a surface of the base part, on which the light-emitting element is mounted.

* * * * *